(12) United States Patent
Sirdeshpande et al.

(10) Patent No.: US 9,328,920 B2
(45) Date of Patent: May 3, 2016

(54) USE OF CONTAMINATED LOW-RANK COAL FOR COMBUSTION

(71) Applicant: GreatPoint Energy, Inc., Cambridge, MA (US)

(72) Inventors: Avinash Sirdeshpande, Chicago, IL (US); Kenneth P. Keckler, Naperville, IL (US); Earl T. Robinson, Lakeland, FL (US); Pattabhi K. Raman, Kildeer, IL (US)

(73) Assignee: GreatPoint Energy, Inc., Cambridge, MA (US)

(*) Notice: Subject to any disclaimer, the term of this patent is extended or adjusted under 35 U.S.C. 154(b) by 410 days.

(21) Appl. No.: 14/040,058

(22) Filed: Sep. 27, 2013

(65) Prior Publication Data

US 2014/0090584 A1 Apr. 3, 2014

Related U.S. Application Data

(60) Provisional application No. 61/708,104, filed on Oct. 1, 2012, provisional application No. 61/775,771, filed on Mar. 11, 2013, provisional application No. 61/815,800, filed on Apr. 25, 2013.

(51) Int. Cl.
| | |
|---|---|
| *F23K 1/00* | (2006.01) |
| *C10L 9/00* | (2006.01) |
| *F23K 1/02* | (2006.01) |
| *F23K 1/04* | (2006.01) |
| *F23C 10/10* | (2006.01) |
| *C10L 9/08* | (2006.01) |
| *C10L 5/36* | (2006.01) |

(Continued)

(52) U.S. Cl.
CPC . *F23K 1/00* (2013.01); *C10L 5/366* (2013.01); *C10L 9/00* (2013.01); *C10L 9/08* (2013.01); *F23C 10/10* (2013.01); *F23K 1/02* (2013.01); *F23K 1/04* (2013.01); *F23K 3/02* (2013.01); *F23L 7/007* (2013.01); *F23K 2201/10* (2013.01); *F23K 2201/20* (2013.01); *F23K 2900/01001* (2013.01)

(58) Field of Classification Search
CPC .............. C10L 9/00; B01D 2257/2045; B01D 2257/2025; F23K 1/02
See application file for complete search history.

(56) References Cited

U.S. PATENT DOCUMENTS

| | | |
|---|---|---|
| 2,605,215 A | 7/1952 | Coghlan |
| 2,694,623 A | 11/1954 | Welty, Jr. et al. |

(Continued)

FOREIGN PATENT DOCUMENTS

| | | |
|---|---|---|
| CA | 966660 | 4/1975 |
| CA | 1003217 | 1/1977 |

(Continued)

OTHER PUBLICATIONS

U.S. Appl. No. 12/778,538, filed May 12, 2010, Robinson, et al.

(Continued)

*Primary Examiner* — David J Laux
(74) *Attorney, Agent, or Firm* — McDonnell Boehnen Hulbert & Berghoff LLP

(57) ABSTRACT

The present invention relates generally to processes for preparing an inorganic sodium and/or chlorine contaminated low-rank coal feedstock for combustion in a fluidized fuel combustor to generate steam and, desirably, co-generate electricity.

17 Claims, 3 Drawing Sheets

(51) Int. Cl.
*F23K 3/02* (2006.01)
*F23L 7/00* (2006.01)

(56) References Cited

U.S. PATENT DOCUMENTS

| | | | |
|---|---|---|---|
| 2,791,549 A | 5/1957 | Jahnig |
| 2,813,126 A | 11/1957 | Tierney |
| 2,860,959 A | 11/1958 | Pettyjohn et al. |
| 2,886,405 A | 5/1959 | Benson et al. |
| 3,034,848 A | 5/1962 | King |
| 3,114,930 A | 12/1963 | Oldham et al. |
| 3,150,716 A | 9/1964 | Strelzoff et al. |
| 3,164,330 A | 1/1965 | Neidl |
| 3,351,563 A | 11/1967 | Negra et al. |
| 3,435,590 A | 4/1969 | Smith |
| 3,531,917 A | 10/1970 | Grunewald et al. |
| 3,544,291 A | 12/1970 | Schlinger et al. |
| 3,594,985 A | 7/1971 | Ameen et al. |
| 3,615,300 A | 10/1971 | Holm et al. |
| 3,689,240 A | 9/1972 | Aldridge et al. |
| 3,740,193 A | 6/1973 | Aldridge et al. |
| 3,746,522 A | 7/1973 | Donath |
| 3,759,036 A | 9/1973 | White |
| 3,779,725 A | 12/1973 | Hegarty et al. |
| 3,814,725 A | 6/1974 | Zimmerman et al. |
| 3,817,725 A | 6/1974 | Sieg et al. |
| 3,828,474 A | 8/1974 | Quartulli |
| 3,833,327 A | 9/1974 | Pitzer et al. |
| 3,847,567 A | 11/1974 | Kalina et al. |
| 3,876,393 A | 4/1975 | Kasai et al. |
| 3,904,386 A | 9/1975 | Graboski et al. |
| 3,915,670 A | 10/1975 | Lacey et al. |
| 3,920,229 A | 11/1975 | Piggott |
| 3,929,431 A | 12/1975 | Koh et al. |
| 3,958,957 A | 5/1976 | Koh et al. |
| 3,966,875 A | 6/1976 | Bratzler et al. |
| 3,969,089 A | 7/1976 | Moss et al. |
| 3,971,639 A | 7/1976 | Matthews |
| 3,972,693 A | 8/1976 | Wiesner et al. |
| 3,975,168 A | 8/1976 | Gorbaty |
| 3,985,519 A | 10/1976 | Kalina et al. |
| 3,989,811 A | 11/1976 | Hill |
| 3,996,014 A | 12/1976 | Muller et al. |
| 3,998,607 A | 12/1976 | Wesselhoft et al. |
| 3,999,607 A | 12/1976 | Pennington et al. |
| 4,005,996 A | 2/1977 | Hausberger et al. |
| 4,011,066 A | 3/1977 | Bratzler et al. |
| 4,017,272 A | 4/1977 | Anwer et al. |
| 4,021,370 A | 5/1977 | Harris et al. |
| 4,025,423 A | 5/1977 | Stonner et al. |
| 4,044,098 A | 8/1977 | Miller et al. |
| 4,046,523 A | 9/1977 | Kalina et al. |
| 4,052,176 A | 10/1977 | Child et al. |
| 4,053,554 A | 10/1977 | Reed et al. |
| 4,057,512 A | 11/1977 | Vadovic et al. |
| 4,069,304 A | 1/1978 | Starkovish et al. |
| 4,077,778 A | 3/1978 | Nahas et al. |
| 4,091,073 A | 5/1978 | Winkler |
| 4,092,125 A | 5/1978 | Stambaugh et al. |
| 4,094,650 A | 6/1978 | Koh et al. |
| 4,100,256 A | 7/1978 | Bozzelli et al. |
| 4,101,449 A | 7/1978 | Noda et al. |
| 4,104,201 A | 8/1978 | Banks et al. |
| 4,113,615 A | 9/1978 | Gorbaty |
| 4,116,996 A | 9/1978 | Huang |
| 4,118,204 A | 10/1978 | Eakman et al. |
| 4,152,119 A | 5/1979 | Schulz |
| 4,157,246 A | 6/1979 | Eakman et al. |
| 4,159,195 A | 6/1979 | Clavenna |
| 4,162,902 A | 7/1979 | Wiesner et al. |
| 4,173,465 A | 11/1979 | Meissner et al. |
| 4,189,307 A | 2/1980 | Marion |
| 4,192,652 A | 3/1980 | Smith |
| 4,193,771 A | 3/1980 | Sharp et al. |
| 4,193,772 A | 3/1980 | Sharp |
| 4,200,439 A | 4/1980 | Lang |
| 4,204,843 A | 5/1980 | Neavel |
| 4,211,538 A | 7/1980 | Eakman et al. |
| 4,211,669 A | 7/1980 | Eakman et al. |
| 4,219,338 A | 8/1980 | Wolfs et al. |
| 4,223,728 A | 9/1980 | Pegg |
| 4,225,457 A | 9/1980 | Schulz |
| 4,235,044 A | 11/1980 | Cheung |
| 4,243,639 A | 1/1981 | Haas et al. |
| 4,249,471 A | 2/1981 | Gunnerman |
| 4,252,771 A | 2/1981 | Lagana et al. |
| 4,260,421 A | 4/1981 | Brown et al. |
| 4,265,868 A | 5/1981 | Kamody |
| 4,270,937 A | 6/1981 | Adler et al. |
| 4,284,416 A | 8/1981 | Nahas |
| 4,292,048 A | 9/1981 | Wesselhoft et al. |
| 4,298,584 A | 11/1981 | Makrides |
| 4,315,753 A | 2/1982 | Bruckenstein et al. |
| 4,315,758 A | 2/1982 | Patel et al. |
| 4,318,712 A | 3/1982 | Lang et al. |
| 4,322,222 A | 3/1982 | Sass |
| 4,330,305 A | 5/1982 | Kuessner et al. |
| 4,331,451 A | 5/1982 | Isogaya et al. |
| 4,334,893 A | 6/1982 | Lang |
| 4,336,034 A | 6/1982 | Lang et al. |
| 4,336,233 A | 6/1982 | Appl et al. |
| 4,341,531 A | 7/1982 | Duranleau et al. |
| 4,344,486 A | 8/1982 | Parrish |
| 4,347,063 A | 8/1982 | Sherwood et al. |
| 4,348,486 A | 9/1982 | Calvin et al. |
| 4,348,487 A | 9/1982 | Calvin et al. |
| 4,353,713 A | 10/1982 | Cheng |
| 4,365,975 A | 12/1982 | Williams et al. |
| 4,372,755 A | 2/1983 | Tolman et al. |
| 4,375,362 A | 3/1983 | Moss |
| 4,385,905 A | 5/1983 | Tucker |
| 4,397,656 A | 8/1983 | Ketkar |
| 4,400,182 A | 8/1983 | Davies et al. |
| 4,407,206 A | 10/1983 | Bartok et al. |
| 4,412,840 A | 11/1983 | Goksel |
| 4,428,535 A | 1/1984 | Venetucci |
| 4,432,773 A | 2/1984 | Euker, Jr. et al. |
| 4,433,065 A | 2/1984 | Van der Burgt et al. |
| 4,436,028 A | 3/1984 | Wilder |
| 4,436,531 A | 3/1984 | Estabrook et al. |
| 4,439,210 A | 3/1984 | Lancet |
| 4,443,415 A | 4/1984 | Queneau et al. |
| 4,444,568 A | 4/1984 | Beisswenger et al. |
| 4,459,138 A | 7/1984 | Soung |
| 4,462,814 A | 7/1984 | Holmes et al. |
| 4,466,828 A | 8/1984 | Tamai et al. |
| 4,468,231 A | 8/1984 | Bartok et al. |
| 4,478,425 A | 10/1984 | Benko |
| 4,478,725 A | 10/1984 | Velling et al. |
| 4,482,529 A | 11/1984 | Chen et al. |
| 4,491,609 A | 1/1985 | Degel et al. |
| 4,497,784 A | 2/1985 | Diaz |
| 4,500,323 A | 2/1985 | Siegfried et al. |
| 4,505,881 A | 3/1985 | Diaz |
| 4,508,544 A | 4/1985 | Moss |
| 4,508,693 A | 4/1985 | Diaz |
| 4,514,912 A * | 5/1985 | Janusch ............ F26B 7/00 34/393 |
| 4,515,604 A | 5/1985 | Eisenlohr et al. |
| 4,515,764 A | 5/1985 | Diaz |
| 4,524,050 A | 6/1985 | Chen et al. |
| 4,540,681 A | 9/1985 | Kustes et al. |
| 4,541,841 A | 9/1985 | Reinhardt |
| 4,551,155 A | 11/1985 | Wood et al. |
| 4,558,027 A | 12/1985 | McKee et al. |
| 4,572,826 A | 2/1986 | Moore |
| 4,594,140 A | 6/1986 | Cheng |
| 4,597,775 A | 7/1986 | Billimoria et al. |
| 4,597,776 A | 7/1986 | Ullman et al. |
| 4,604,105 A | 8/1986 | Aquino et al. |
| 4,609,388 A | 9/1986 | Adler et al. |
| 4,609,456 A | 9/1986 | Deschamps et al. |
| 4,617,027 A | 10/1986 | Lang |
| 4,619,864 A | 10/1986 | Hendrix et al. |

(56) References Cited

U.S. PATENT DOCUMENTS

| | | | |
|---|---|---|---|
| 4,620,421 A | | 11/1986 | Brown et al. |
| 4,661,237 A | | 4/1987 | Kimura et al. |
| 4,668,428 A | | 5/1987 | Najjar |
| 4,668,429 A | | 5/1987 | Najjar |
| 4,675,035 A | | 6/1987 | Apffel |
| 4,678,480 A | | 7/1987 | Heinrich et al. |
| 4,682,986 A | | 7/1987 | Lee et al. |
| 4,690,814 A | | 9/1987 | Velenyi et al. |
| 4,696,678 A | | 9/1987 | Koyama et al. |
| 4,699,632 A | | 10/1987 | Babu et al. |
| 4,704,136 A | | 11/1987 | Weston et al. |
| 4,720,289 A | | 1/1988 | Vaugh et al. |
| 4,747,938 A | | 5/1988 | Khan |
| H000478 H | * | 6/1988 | Blytas .................. C10L 9/02 208/403 |
| 4,781,731 A | | 11/1988 | Schlinger |
| 4,803,061 A | | 2/1989 | Najjar et al. |
| 4,808,194 A | | 2/1989 | Najjar et al. |
| 4,810,475 A | | 3/1989 | Chu et al. |
| 4,822,935 A | | 4/1989 | Scott |
| 4,848,983 A | | 7/1989 | Tomita et al. |
| 4,854,944 A | | 8/1989 | Strong |
| 4,861,346 A | | 8/1989 | Najjar et al. |
| 4,861,360 A | | 8/1989 | Apffel |
| 4,872,886 A | | 10/1989 | Henley et al. |
| 4,876,080 A | | 10/1989 | Paulson |
| 4,892,567 A | | 1/1990 | Yan |
| 4,960,450 A | | 10/1990 | Schwarz et al. |
| 4,995,193 A | | 2/1991 | Soga et al. |
| 5,017,282 A | | 5/1991 | Delbianco et al. |
| 5,055,181 A | | 10/1991 | Maa et al. |
| 5,057,294 A | | 10/1991 | Sheth et al. |
| 5,059,406 A | | 10/1991 | Sheth et al. |
| 5,074,357 A | | 12/1991 | Haines |
| 5,093,094 A | | 3/1992 | Van Kleeck et al. |
| 5,094,737 A | | 3/1992 | Bearden, Jr. et al. |
| 5,132,007 A | | 7/1992 | Meyer et al. |
| 5,223,173 A | | 6/1993 | Jeffrey |
| 5,225,044 A | | 7/1993 | Breu |
| 5,236,557 A | | 8/1993 | Muller et al. |
| 5,242,470 A | | 9/1993 | Salter et al. |
| 5,250,083 A | | 10/1993 | Wolfenbarger et al. |
| 5,277,884 A | | 1/1994 | Shinnar et al. |
| 5,354,345 A | * | 10/1994 | Nehls, Jr. ............ C10L 9/086 44/626 |
| 5,388,645 A | | 2/1995 | Puri et al. |
| 5,388,650 A | | 2/1995 | Michael |
| 5,435,940 A | | 7/1995 | Doering et al. |
| 5,505,746 A | * | 4/1996 | Chriswell ............ C10L 9/02 44/622 |
| 5,536,893 A | | 7/1996 | Gudmundsson |
| 5,566,755 A | | 10/1996 | Seidle et al. |
| 5,616,154 A | | 4/1997 | Elliott et al. |
| 5,630,854 A | | 5/1997 | Sealock, Jr. et al. |
| 5,641,327 A | | 6/1997 | Leas |
| 5,660,807 A | | 8/1997 | Forg et al. |
| 5,669,960 A | | 9/1997 | Couche |
| 5,670,122 A | | 9/1997 | Zamansky et al. |
| 5,720,785 A | | 2/1998 | Baker |
| 5,733,515 A | | 3/1998 | Doughty et al. |
| 5,769,165 A | | 6/1998 | Bross et al. |
| 5,776,212 A | | 7/1998 | Leas |
| 5,788,724 A | | 8/1998 | Carugati et al. |
| 5,855,631 A | | 1/1999 | Leas |
| 5,865,898 A | | 2/1999 | Holtzapple et al. |
| 5,968,465 A | | 10/1999 | Koveal et al. |
| 6,013,158 A | | 1/2000 | Wootten |
| 6,015,104 A | | 1/2000 | Rich, Jr. |
| 6,028,234 A | | 2/2000 | Heinemann et al. |
| 6,032,737 A | | 3/2000 | Brady et al. |
| 6,090,356 A | | 7/2000 | Jahnke et al. |
| 6,119,778 A | | 9/2000 | Seidle et al. |
| 6,132,478 A | | 10/2000 | Tsurui et al. |
| 6,180,843 B1 | | 1/2001 | Heinemann et al. |
| 6,187,465 B1 | | 2/2001 | Galloway |
| 6,379,645 B1 | | 4/2002 | Bucci et al. |
| 6,389,820 B1 | | 5/2002 | Rogers et al. |
| 6,419,888 B1 | | 7/2002 | Wyckoff |
| 6,506,349 B1 | | 1/2003 | Khanmamedov |
| 6,506,361 B1 | | 1/2003 | Machado et al. |
| 6,602,326 B2 | | 8/2003 | Lee et al. |
| 6,641,625 B1 | | 11/2003 | Clawson et al. |
| 6,653,516 B1 | | 11/2003 | Yoshikawa et al. |
| 6,692,711 B1 | | 2/2004 | Alexion et al. |
| 6,790,430 B1 | | 9/2004 | Lackner et al. |
| 6,797,253 B2 | | 9/2004 | Lyon |
| 6,808,543 B2 | | 10/2004 | Paisley |
| 6,830,597 B1 | | 12/2004 | Green |
| 6,855,852 B1 | | 2/2005 | Jackson et al. |
| 6,878,358 B2 | | 4/2005 | Vosteen et al. |
| 6,894,183 B2 | | 5/2005 | Choudhary et al. |
| 6,955,595 B2 | | 10/2005 | Kim |
| 6,955,695 B2 | | 10/2005 | Nahas |
| 6,969,494 B2 | | 11/2005 | Herbst |
| 7,056,359 B1 | | 6/2006 | Somerville et al. |
| 7,074,373 B1 | | 7/2006 | Warren et al. |
| 7,077,202 B2 | | 7/2006 | Shaw et al. |
| 7,100,692 B2 | | 9/2006 | Parsley et al. |
| 7,118,720 B1 | | 10/2006 | Mendelsohn et al. |
| 7,132,183 B2 | | 11/2006 | Galloway |
| 7,168,488 B2 | | 1/2007 | Olsvik et al. |
| 7,205,448 B2 | | 4/2007 | Gajda et al. |
| 7,220,502 B2 | | 5/2007 | Galloway |
| 7,299,868 B2 | | 11/2007 | Zapadinski |
| 7,309,383 B2 | | 12/2007 | Beech, Jr. et al. |
| 7,481,275 B2 | | 1/2009 | Olsvik et al. |
| 7,666,383 B2 | | 2/2010 | Green |
| 7,677,309 B2 | | 3/2010 | Shaw et al. |
| 7,758,663 B2 | | 7/2010 | Rabovitser et al. |
| 7,897,126 B2 | | 3/2011 | Rappas et al. |
| 7,901,644 B2 | | 3/2011 | Rappas et al. |
| 7,922,782 B2 | | 4/2011 | Sheth |
| 7,926,750 B2 | | 4/2011 | Hauserman |
| 7,976,593 B2 | | 7/2011 | Graham |
| 8,021,445 B2 | * | 9/2011 | Shaffer ............ C10L 9/08 34/405 |
| 8,114,176 B2 | | 2/2012 | Nahas |
| 8,114,177 B2 | | 2/2012 | Hippo et al. |
| 8,123,827 B2 | | 2/2012 | Robinson |
| 8,163,048 B2 | | 4/2012 | Rappas et al. |
| 8,192,716 B2 | | 6/2012 | Raman et al. |
| 8,202,913 B2 | | 6/2012 | Robinson et al. |
| 8,268,899 B2 | | 9/2012 | Robinson et al. |
| 8,286,901 B2 | | 10/2012 | Rappas et al. |
| 8,297,542 B2 | | 10/2012 | Rappas et al. |
| 8,328,890 B2 | | 12/2012 | Reiling et al. |
| 8,349,037 B2 | | 1/2013 | Steiner et al. |
| 8,349,039 B2 | | 1/2013 | Robinson |
| 8,361,428 B2 | | 1/2013 | Raman et al. |
| 8,366,795 B2 | | 2/2013 | Raman et al. |
| 8,479,833 B2 | | 7/2013 | Raman |
| 8,479,834 B2 | | 7/2013 | Preston |
| 8,502,007 B2 | | 8/2013 | Hippo et al. |
| 2002/0036086 A1 | | 3/2002 | Minkkinen et al. |
| 2003/0070808 A1 | | 4/2003 | Allison |
| 2003/0131582 A1 | | 7/2003 | Anderson et al. |
| 2003/0167691 A1 | | 9/2003 | Nahas |
| 2004/0020123 A1 | | 2/2004 | Kimura et al. |
| 2004/0023086 A1 | | 2/2004 | Su et al. |
| 2004/0123601 A1 | | 7/2004 | Fan |
| 2004/0180971 A1 | | 9/2004 | Inoue et al. |
| 2004/0256116 A1 | | 12/2004 | Olsvik et al. |
| 2005/0107648 A1 | | 5/2005 | Kimura et al. |
| 2005/0137442 A1 | | 6/2005 | Gajda et al. |
| 2005/0192362 A1 | | 9/2005 | Rodriguez et al. |
| 2005/0287056 A1 | | 12/2005 | Baker et al. |
| 2005/0288537 A1 | | 12/2005 | Maund et al. |
| 2006/0149423 A1 | | 7/2006 | Barnicki et al. |
| 2006/0228290 A1 | | 10/2006 | Green |
| 2006/0231252 A1 | | 10/2006 | Shaw et al. |
| 2006/0265953 A1 | | 11/2006 | Hobbs |
| 2006/0272813 A1 | | 12/2006 | Olsvik et al. |
| 2007/0000177 A1 | | 1/2007 | Hippo et al. |
| 2007/0051043 A1 | | 3/2007 | Schingnitz |

(56) References Cited

U.S. PATENT DOCUMENTS

| | | |
|---|---|---|
| 2007/0083072 A1 | 4/2007 | Nahas |
| 2007/0180990 A1 | 8/2007 | Downs et al. |
| 2007/0186472 A1 | 8/2007 | Rabovitser et al. |
| 2007/0220810 A1 | 9/2007 | Leveson et al. |
| 2007/0227729 A1 | 10/2007 | Zubrin et al. |
| 2007/0237696 A1 | 10/2007 | Payton |
| 2007/0277437 A1 | 12/2007 | Sheth |
| 2007/0282018 A1 | 12/2007 | Jenkins |
| 2008/0022586 A1 | 1/2008 | Gilbert et al. |
| 2008/0141591 A1 | 6/2008 | Kohl |
| 2008/0289822 A1 | 11/2008 | Betzer Tsilevich |
| 2009/0012188 A1 | 1/2009 | Rojey et al. |
| 2009/0048476 A1 | 2/2009 | Rappas et al. |
| 2009/0090055 A1 | 4/2009 | Ohtsuka |
| 2009/0090056 A1 | 4/2009 | Ohtsuka |
| 2009/0165361 A1 | 7/2009 | Rappas et al. |
| 2009/0165376 A1 | 7/2009 | Lau et al. |
| 2009/0165379 A1 | 7/2009 | Rappas |
| 2009/0165380 A1 | 7/2009 | Lau et al. |
| 2009/0165381 A1 | 7/2009 | Robinson |
| 2009/0165382 A1 | 7/2009 | Rappas et al. |
| 2009/0165383 A1 | 7/2009 | Rappas et al. |
| 2009/0165384 A1 | 7/2009 | Lau et al. |
| 2009/0166588 A1 | 7/2009 | Spitz et al. |
| 2009/0169448 A1 | 7/2009 | Rappas et al. |
| 2009/0169449 A1 | 7/2009 | Rappas et al. |
| 2009/0170968 A1 | 7/2009 | Nahas et al. |
| 2009/0173079 A1 | 7/2009 | Wallace et al. |
| 2009/0217575 A1 | 9/2009 | Raman et al. |
| 2009/0217582 A1 | 9/2009 | May et al. |
| 2009/0217584 A1 | 9/2009 | Raman et al. |
| 2009/0217585 A1 | 9/2009 | Raman et al. |
| 2009/0217586 A1 | 9/2009 | Rappas et al. |
| 2009/0217587 A1 | 9/2009 | Raman et al. |
| 2009/0217588 A1 | 9/2009 | Hippo et al. |
| 2009/0217589 A1 | 9/2009 | Robinson |
| 2009/0217590 A1 | 9/2009 | Rappas et al. |
| 2009/0218424 A1 | 9/2009 | Hauserman |
| 2009/0220406 A1 | 9/2009 | Rahman |
| 2009/0229182 A1 | 9/2009 | Raman et al. |
| 2009/0235585 A1 | 9/2009 | Neels et al. |
| 2009/0236093 A1 | 9/2009 | Zubrin et al. |
| 2009/0246120 A1 | 10/2009 | Raman et al. |
| 2009/0259080 A1 | 10/2009 | Raman et al. |
| 2009/0260287 A1 | 10/2009 | Lau |
| 2009/0305093 A1 | 12/2009 | Biollaz et al. |
| 2009/0324458 A1 | 12/2009 | Robinson et al. |
| 2009/0324459 A1 | 12/2009 | Robinson et al. |
| 2009/0324460 A1 | 12/2009 | Robinson et al. |
| 2009/0324461 A1 | 12/2009 | Robinson et al. |
| 2009/0324462 A1 | 12/2009 | Robinson et al. |
| 2010/0005710 A1 | 1/2010 | Shaffer |
| 2010/0018113 A1 | 1/2010 | Bohlig et al. |
| 2010/0050654 A1 | 3/2010 | Chiu et al. |
| 2010/0071235 A1 | 3/2010 | Pan et al. |
| 2010/0071262 A1 | 3/2010 | Robinson et al. |
| 2010/0076235 A1 | 3/2010 | Reiling et al. |
| 2010/0120926 A1 | 5/2010 | Robinson et al. |
| 2010/0121125 A1 | 5/2010 | Hippo et al. |
| 2010/0159352 A1 | 6/2010 | Gelin et al. |
| 2010/0168494 A1 | 7/2010 | Rappas et al. |
| 2010/0168495 A1 | 7/2010 | Rappas et al. |
| 2010/0179232 A1 | 7/2010 | Robinson et al. |
| 2010/0287835 A1 | 11/2010 | Reiling et al. |
| 2010/0287836 A1 | 11/2010 | Robinson et al. |
| 2010/0292350 A1 | 11/2010 | Robinson et al. |
| 2011/0031439 A1 | 2/2011 | Sirdeshpande et al. |
| 2011/0062012 A1 | 3/2011 | Robinson |
| 2011/0062721 A1 | 3/2011 | Sirdeshpande et al. |
| 2011/0062722 A1 | 3/2011 | Sirdeshpande et al. |
| 2011/0064648 A1 | 3/2011 | Preston et al. |
| 2011/0088896 A1 | 4/2011 | Preston |
| 2011/0088897 A1 | 4/2011 | Raman |
| 2011/0146978 A1 | 6/2011 | Perlman |
| 2011/0146979 A1 | 6/2011 | Wallace |
| 2011/0197501 A1 | 8/2011 | Taulbee |
| 2011/0207002 A1 | 8/2011 | Powell et al. |
| 2011/0217602 A1 | 9/2011 | Sirdeshpande |
| 2011/0262323 A1 | 10/2011 | Rappas et al. |
| 2011/0294905 A1 | 12/2011 | Robinson et al. |
| 2012/0046510 A1 | 2/2012 | Sirdeshpande |
| 2012/0060417 A1 | 3/2012 | Raman et al. |
| 2012/0102836 A1 | 5/2012 | Raman et al. |
| 2012/0102837 A1 | 5/2012 | Raman et al. |
| 2012/0210635 A1 | 8/2012 | Edwards |
| 2012/0213680 A1 | 8/2012 | Rappas et al. |
| 2012/0271072 A1 | 10/2012 | Robinson et al. |
| 2012/0305848 A1 | 12/2012 | Sirdeshpande |
| 2013/0042824 A1 | 2/2013 | Sirdeshpande |
| 2013/0046124 A1 | 2/2013 | Sirdeshpande |
| 2013/0172640 A1 | 7/2013 | Robinson et al. |

FOREIGN PATENT DOCUMENTS

| | | |
|---|---|---|
| CA | 1041553 | 10/1978 |
| CA | 1106178 | 8/1981 |
| CA | 1 125 026 | 6/1982 |
| CA | 1187702 | 6/1985 |
| CA | 1282243 | 4/1991 |
| CA | 1299589 | 4/1992 |
| CA | 1332108 | 9/1994 |
| CA | 2673121 | 6/2008 |
| CA | 2713642 | 7/2009 |
| CN | 1477090 | 2/2004 |
| CN | 101555420 | 10/2009 |
| EP | 0024792 | 3/1981 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0473153 | 3/1992 |
| EP | 0 723 930 | 7/1996 |
| EP | 819 | 4/2000 |
| EP | 1001002 | 5/2000 |
| EP | 1004746 | 5/2000 |
| EP | 1136542 | 9/2001 |
| EP | 1 207 132 | 5/2002 |
| EP | 1768207 | 3/2007 |
| EP | 2058471 | 5/2009 |
| FR | 2 478 615 | 9/1981 |
| FR | 2906879 | 4/2008 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 820 257 | 9/1959 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1 599 932 | 7/1977 |
| GB | 1560873 | 2/1980 |
| GB | 2078251 | 1/1982 |
| GB | 2154600 | 9/1985 |
| GB | 2455864 | 6/2009 |
| JP | 53-94305 | 8/1978 |
| JP | 53-111302 | 9/1978 |
| JP | 54020003 | 2/1979 |
| JP | 54-150402 | 11/1979 |
| JP | 55-12181 | 1/1980 |
| JP | 56-145982 | 11/1981 |
| JP | 56157493 | 12/1981 |
| JP | 60-77938 | 5/1985 |
| JP | 62241991 | 10/1987 |
| JP | 62 257985 | 11/1987 |
| JP | 03-115491 | 5/1991 |
| JP | 2000290659 | 10/2000 |
| JP | 2000290670 | 10/2000 |
| JP | 2002105467 | 4/2002 |

(56) References Cited

FOREIGN PATENT DOCUMENTS

| | | |
|---|---|---|
| JP | 2004292200 | 10/2004 |
| JP | 2004298818 | 10/2004 |
| JP | 2006 169476 | 6/2006 |
| WO | 00/18681 | 4/2000 |
| WO | 00/43468 | 7/2000 |
| WO | 02/40768 | 5/2002 |
| WO | 02/079355 | 10/2002 |
| WO | 02/103157 | 12/2002 |
| WO | 03/018958 | 3/2003 |
| WO | 03/033624 | 4/2003 |
| WO | 2004/055323 | 7/2004 |
| WO | 2004/072210 | 8/2004 |
| WO | 2006/031011 | 3/2006 |
| WO | 2007/005284 | 1/2007 |
| WO | 2007/047210 | 4/2007 |
| WO | 2007/068682 | 6/2007 |
| WO | 2007/076363 | 7/2007 |
| WO | 2007/077137 | 7/2007 |
| WO | 2007/077138 | 7/2007 |
| WO | 2007/083072 | 7/2007 |
| WO | 2007/128370 | 11/2007 |
| WO | 2007/143376 | 12/2007 |
| WO | 2008/058636 | 5/2008 |
| WO | 2008/073889 | 6/2008 |
| WO | 2008/087154 | 7/2008 |
| WO | 2009/018053 | 2/2009 |
| WO | 2009/048723 | 4/2009 |
| WO | 2009/048724 | 4/2009 |
| WO | 2009/086361 | 7/2009 |
| WO | 2009/086362 | 7/2009 |
| WO | 2009/086363 | 7/2009 |
| WO | 2009/086366 | 7/2009 |
| WO | 2009/086367 | 7/2009 |
| WO | 2009/086370 | 7/2009 |
| WO | 2009/086372 | 7/2009 |
| WO | 2009/086374 | 7/2009 |
| WO | 2009/086377 | 7/2009 |
| WO | 2009/086383 | 7/2009 |
| WO | 2009/086407 | 7/2009 |
| WO | 2009/086408 | 7/2009 |
| WO | 2009/111330 | 9/2009 |
| WO | 2009/111331 | 9/2009 |
| WO | 2009/111332 | 9/2009 |
| WO | 2009/111335 | 9/2009 |
| WO | 2009/111342 | 9/2009 |
| WO | 2009/111345 | 9/2009 |
| WO | 2009/124017 | 10/2009 |
| WO | 2009/124019 | 10/2009 |
| WO | 2009/158576 | 12/2009 |
| WO | 2009/158579 | 12/2009 |
| WO | 2009/158580 | 12/2009 |
| WO | 2009/158582 | 12/2009 |
| WO | 2009/158583 | 12/2009 |
| WO | 2010/033846 | 3/2010 |
| WO | 2010/033848 | 3/2010 |
| WO | 2010/033850 | 3/2010 |
| WO | 2010/033852 | 3/2010 |
| WO | 2010/048493 | 4/2010 |
| WO | 2010/078297 | 7/2010 |
| WO | 2010/078298 | 7/2010 |
| WO | 2010/132549 | 11/2010 |
| WO | 2010/132551 | 11/2010 |
| WO | 2011/017630 | 2/2011 |
| WO | 2011/029278 | 3/2011 |
| WO | 2011/029282 | 3/2011 |
| WO | 2011/029283 | 3/2011 |
| WO | 2011/029284 | 3/2011 |
| WO | 2011/029285 | 3/2011 |
| WO | 2011/034888 | 3/2011 |
| WO | 2011/034889 | 3/2011 |
| WO | 2011/034890 | 3/2011 |
| WO | 2011/034891 | 3/2011 |
| WO | 2011/049858 | 4/2011 |
| WO | 2011/049861 | 4/2011 |
| WO | 2011/063608 | 6/2011 |
| WO | 2011/084580 | 7/2011 |
| WO | 2011/084581 | 7/2011 |
| WO | 2011/106285 | 9/2011 |
| WO | 2011/139694 | 11/2011 |
| WO | 2011/150217 | 12/2011 |
| WO | 2012/024369 | 2/2012 |
| WO | 2012/033997 | 3/2012 |
| WO | 2012/061235 | 5/2012 |
| WO | 2012/061238 | 5/2012 |
| WO | 2012/116003 | 8/2012 |
| WO | 2012/145497 | 10/2012 |
| WO | 2012/166879 | 12/2012 |
| WO | 2013/025808 | 2/2013 |
| WO | 2013/025812 | 2/2013 |
| WO | 2013/052553 | 4/2013 |

OTHER PUBLICATIONS

U.S. Appl. No. 12/778,548, filed May 12, 2010, Robinson, et al.
U.S. Appl. No. 12/778,552, filed May 12, 2010, Robinson, et al.
Asami, K., et al., "Highly Active Iron Catalysts from Ferric Chloride or the Steam Gasification of Brown Coal," ind. Eng. Chem. Res., vol. 32, No. 8, 1993, pp. 1631-1636.
Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.
Brown et al., "Biomass-Derived Hydrogen From a Thermally Ballasted Gasifier," Aug. 2005.
Brown et al., "Biomass-Derived Hydrogen From a Thermally Ballasted Gasifier," DOE Hydrogen Program Contractors' Review Metting, Center for Sustainable Environmental Technologies, Iowa State University, May 21, 2003.
Cohen, S.J., Project Manager, "Large Pilot Plant Alternatives for Scaleup of the Catalytic Coal Gasification Process," FE-2480-20, U.S. Dept. of Energy, Contract No., EX-76-C-01-2480, 1979.
Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.
Kalina, T., Nahas, N.C., Project Managers, "Exxon Catalaytic Coal Gasification Process Predevelopment Program," Exxon Research & Engineering Company, FE-2369-24, U.S. Dept. of Energy, Contract No., E(49-18)-2369, 1978.
Nahas, N.C., "Exxon Catalytic Coal Gasification Process—Fundamentals to Flowsheets," Fuel, vol. 62, No. 2, 1983, pp. 239-241.
Ohtsuka, Y. et al., "Highly Active Catalysts from Inexpensive Raw Materials for Coal Gasification," Catalysis Today, vol. 39, 1997, pp. 111-125.
Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.
Ohtsuka, Yasuo et al., "Calcium Catalysed Steam Gasification of Yalourn Brown Coal," Fuel, vol. 65, 1986, pp. 1653-1657.
Ohtsuka, Yasuo, et al, "Iron-Catalyzed Gasification of Brown Coal at Low Temperatures," Energy & Fuels, vol. 1, No. 1, 1987, pp. 32-36.
Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.
Ohtsuka, Yasuo et al., "Steam Gasification of Coals with Calcium Hydroxide," Energy & Fuels, vol. 9, No. 6, 1995, pp. 1038-1042.
Pereira, P., et al., "Catalytic Steam Gasification of Coals," Energy & Fuels, vol. 6, No. 4, 1992, pp. 407-410.
Ruan Xiang-Quan, et al., "Effects of Catalysis on Gasification of Tatong Coal Char," Fuel, vol. 66, Apr. 1987, pp. 568-571.
Tandon, D., "Low Temperature and Elevated Pressure Steam Gasification of Illinois Coal," College of Engineering in the Graduate School, Southern Illinois university at Carbondale, Jun. 1996.
Adsorption, http://en.wikipedia.org/wiki/Adsorption, pp. 1-8 (Oct. 17, 2007).
Amine gas treating, http://en.wikipedia.org/wiki/Acid_gas_removal, pp. 1-4 (Oct. 21, 2007).
Coal, http://en.wikpedia.org/wiki/Coal_gasification, pp. 1-8 (Oct. 29, 2007).

(56) References Cited

OTHER PUBLICATIONS

Coal Data: A Reference, Energy Information Administration, Office of Coal, Nuclear, Electric, and Alternate Fuels U.S. Department of Energy, DOE/EIA-0064(93), Feb. 1995.

Deepak Tandon, Dissertation Approval, "Low Temperature and Elevated Pressure Steam Gasification of Illinois Coal", Jun. 13, 1996.

Demibras, "Demineralization of Agricultural Residues by Water Leaching", *Energy Sources*, vol. 25, pp. 679-687, (2003).

Fluidized Bed Gasifiers, http://www.energyproducts.com/fluidized_bed_gasifiers.htm, Oct. 2007, pp. 1-5.

Gas separation, http://en.wikipedia.org/wiki/Gas_separation, pp. 1-2 (Feb. 24, 2007).

Gasification, http://en.wikipedia.org/wiki/Gasification, pp. 1-6 (Oct. 29, 2007).

Gallagher Jr., et al., "Catalytic Coal Gasification for SNG Manufacture", *Energy Research*, vol. 4, pp. 137-147, (1980).

Heinemann, et al., "Fundamental and Exploratory Studies of Catalytic Steam Gasification of Carbonaceous Materials", Final Report Fiscal Years 1985-1994.

Jensen, et al. Removal of K and C1 by leaching of straw char, *Biomass and Bioenergy*, vol. 20, pp. 447-457, (2001).

Mengjie, et al., "A potential renewable energy resource development and utilization of biomass energy", http://www.fao.org.docrep/T4470E/t4470e0n.htm, pp. 1-8 (1994).

Meyers, et al. Fly Ash as a Construction Material for Highways, A Manual. Federal Highway Administration, Report No. FHWA-IP-76-16, Washington, DC, 1976.

Moulton, Lyle K. "Bottom Ash and Boiler Slag", *Proceedings of the Third International Ash Utilization Symposium*, U.S. Bureau of Mines, Information Circular No. 8640, Washington, DC, 1973.

Natural gas processing, http://en.wikipedia.org/wiki/Natural_gas_processing, pp. 1-4 (Oct. 22, 2007).

Natural Gas Processing: The Crucial Link Between Natural Gas Production and Its Transportation to Market. Energy Information Administration, Office of Oil and Gas; pp. 1-11, (2006).

Prins, et al., "Exergetic optimisation of a production process of Fischer-Tropsch fuels from biomass", *Fuel Processing Technology*, vol. 86, pp. 375-389, (2004).

Reboiler, http://en.wikipedia.org/wiki/Reboiler, pp. 1-4 (Nov. 11, 2007).

What is XPS?, http://www.nuance.northwestern.edu/KeckII/xps1.asp, 2006, pp. 1-2 (2006).

2.3 Types of gasifiers, http://www.fao.org/docrep/t0512e/T0512e0a.htm, pp. 1-6 (1986).

2.4 Gasification fuels, http://www.fao.org/t0512e0/T0512e0b.htm#TopofPage, pp. 1-8 (1986).

2.5 Design of downdraught gasifiers, http://www.fao.org/docrep/t0512e/T0512e0c.htm#TopOfPage, pp. 1-8 (1986).

2.6 Gas cleaning and cooling, http://www.fao.org/docrep/t0512e0d.htm#TopOfPage, pp. 1-3 (1986).

A.G. Collot et al., "Co-pyrolysis and co-gasification of coal and biomass in bench-scale fixed-bed and fluidized bed reactors", (1999) Fuel 78, pp. 667-679.

Wenkui Zhu et al. "Catalytic gasfcation of char fom co-pyrolysis of coal and biomass", (2008) Fuel Processing Technology, vol. 89, pp. 890-896.

Chiesa P. et al., "Co-Production of hydrogen, electricity and C02 from coal with commercially ready technology. Part A: Performance and emissions", (2005) International Journal of Hydrogen Energy, vol. 30, No. 7, pp. 747-767.

Chiaramonte et al, "Upgrade Coke by Gasification", (1982) Hydrocarbon Processing, vol. 61 (9), pp. 255-257 (Abstract only).

Gerdes, Kristin, et al., "Integrated Gasification Fuel Cell Performance and Cost Assessment," National Energy Technology Laboratory, U.S. Department of Energy, Mar. 27, 2009, pp. 1-26.

Ghosh, S., et al., "Energy Analysis of a Cogeneration Plant Using Coal Gasification and Solid Oxide Fuel Cell," Energy, 2006, vol. 31, No. 2-3, pp. 345-363.

Jeon, S.K., et al., "Characteristics of Steam Hydrogasification of Wood Using a Micro-Batch Reactor," Fuel, 2007, vol. 86, pp. 2817-2823.

Li, Mu, et al., "Design of Highly Efficient Coal-Based Integrated Gasification Fuel Cell Power Plants," Journal of Power Sources, 2010, vol. 195, pp. 5707-5718.

Prins, M.J., et al., "Exergetic Optimisation of a Production Process of Fischer-Tropsch Fuels from Biomass," Fuel Processing Technology, 2005, vol. 86, No. 4, pp. 375-389.

Hydromethanation Process, GreatPoint Energy, Inc., from World Wide Web <http://greatpointenergy.com/ourtechnology.php.> accessed Sep. 5, 2013.

Sigma-Aldrich "Particle Size Conversion Table" (2004); from World Wide Web <http:/www.sigmaaldrich.com/chemistry/learning-center/technical-library/particle-size-conversion.printerview.html>.

\* cited by examiner

USE OF CONTAMINATED LOW-RANK COAL FOR COMBUSTION

CROSS-REFERENCE TO RELATED APPLICATIONS

This application claims priority under 35 U.S.C. §119 from U.S. Provisional Application Ser. Nos. 61/708,104 (filed 1 Oct. 2012), 61/775,771 (filed 11 Mar. 2013) and 61/815,800 (filed 25 Apr. 2013), the disclosures of which are incorporated by reference herein for all purposes as if fully set forth.

This application is related to U.S. application Ser. No. 14/039,321, entitled AGGLOMERATED PARTICULATE LOW-RANK COAL FEEDSTOCK AND USES THEREOF), now U.S. Pat. No. 9,034,061; U.S. application Ser. No. 14/039,402, entitled AGGLOMERATED PARTICULATE LOW-RANK COAL FEEDSTOCK AND USES THEREOF); and U.S. application Ser. No. 14/039,454, entitled AGGLOMERATED PARTICULATE LOW-RANK COAL FEEDSTOCK AND USES THEREOF), now U.S. Pat. No. 9,034,058, all of which are concurrently filed herewith and incorporated by reference herein for all purposes as if fully set forth.

FIELD OF THE INVENTION

The present invention relates generally to processes for preparing an inorganic sodium and/or chlorine contaminated low-rank coal feedstock for combustion in a fluidized fuel combustor to generate steam and, desirably, co-generate electricity. Particularly, the present invention provides for optimal water usage and increased efficiency in such scenario by integrating low-pressure steam from the combustion (and optional electricity) generation section of the process with the feedstock processing section of the process, as well as integrating water recovery and recycle throughout the process.

BACKGROUND OF THE INVENTION

Coal has long been used as a fuel for combustion. Currently, such coals are typically combusted with pressurized air and oxygen in fluidized fuel combustors such as circulating fluidized-bed combustors ("CFBs") and pulverized coal boilers ("PCB"). CFBs generally operate at relatively moderate temperatures of from about 760° C. to about 930° C., and utilize "coarser" fuel particles having a dp(50) typically ranging from about 3000 microns to about 6000 microns. PCBs operate at higher temperatures of from about 1300° C. to about 1700° C., and utilize "finer" fuel particles having a dp(50) typically ranging from about 100 to about 200 microns.

The combustion results in heat energy that can be used to generate steam (e.g., a steam boiler) for a variety of uses, including for driving turbines to generate electricity. The combustion also produces hot gases that can be used to drive a turbine to generate electricity. A cogeneration facility is one in which both electricity and steam are made in order to more efficiently utilize the energy release of combustion, with the steam often being used to drive a steam turbine for additional electricity generation.

Many coals, however, are economically unfeasible for such use due to contamination and physical properties. For example, coals that contain significant amounts of impurities, such as sodium and chlorine (e.g., NaCl), may actually be unusable in combustion processes due to the highly corrosive and fouling nature of such components, thus requiring pretreatment to remove such impurities. Gaseous effluent streams from the combustion of such coals can also be problematic, particularly if the coal is not sufficiently cleaned prior to combustion. See, for example, Tillman, Duong, Figueroa and Miller, "Chlorine in Solid Fuels Fired in Pulverized Coal Boilers-Sources, Forms, Reactions, and Consequences: A Literature Review", Foster Wheeler A G, Presented at Fuel Quality Conference, Banff, Canada, Sep. 28-Oct. 3, 2008.

While washing can be used in an attempt to clean such coals, the washing requires large amounts of fresh water which may not be economically feasible in many regions of the world, particularly those regions (arid areas, for example) where fresh water is at a premium. In addition, washing creates a number of wastewater issues.

Typically the addition of such a pretreatment renders the use of sodium and/or chlorine contaminated coals economically unfeasible. It would, therefore, be desirable to find a way to more efficiently pretreat these contaminated coals to removed a substantial portion of at least the inorganic sodium and/or chlorine content, while minimizing fresh water usage.

"Low-rank" coals are typically softer, friable materials with a dull, earthy appearance. They are characterized by relatively higher moisture levels and relatively lower carbon content, and therefore a lower energy content. Examples of low-rank coals include peat, lignite and sub-bituminous coals. Examples of "high-rank" coals include bituminous and anthracite coals.

In addition to their relatively low heating values, the use of low-ranks coals has other drawbacks. For example, the friability of such coals can lead to high fines losses in the feedstock preparation (grinding and other processing) and in the combustion of such coals. Such fines must be managed or even disposed of, which usually means an economic and efficiency disadvantage (economic and processing disincentive) to the use of such coals. For very highly friable coals such as lignite, such fines losses can approach or even exceed 50% of the original material. In other words, the processing and use of low-rank coals can result in a loss (or less desired use) of a material percentage of the carbon content in the low-rank coal as mined.

Low-rank coals contaminated with sodium and/or chlorine are, therefore, generally considered economically unsuitable for any purpose.

It would, therefore, be desirable to find a way to efficiently process sodium and/or chlorine contaminated low-rank coals to make such coals more economically feasible for combustion uses, while reducing or even eliminating fresh water requirements, as well as potentially reducing fines losses in both the feedstock processing and ultimate conversion of such low-rank coal materials in various combustion processes.

SUMMARY OF THE INVENTION

In a first aspect, the invention provides a process for generating steam from a particulate low-rank coal feedstock, the process comprising the steps of:

(a) providing a raw low-rank coal feedstock comprising an initial contaminant content, wherein the initial contaminant content comprises
   (1) an initial inorganic chlorine content of at least about 0.1 wt % based on the dry weight of the raw low-rank coal feedstock, or
   (2) an initial inorganic sodium content of at least about 0.1 wt % based on the dry weight of the raw low-rank coal feedstock, or
   (3) both (1) and (2);

(b) grinding the raw low-rank coal feedstock to produce a ground low-rank coal feedstock;

(c) washing the ground low-rank coal feedstock with an aqueous wash stream to generate a washed ground low-rank coal feedstock and a wastewater stream, the washed ground low-rank coal feedstock having
  (1) a washed inorganic chlorine content of less than about 50 wt % of the initial inorganic chlorine content, but no greater than about 0.1 wt % based on the dry weight of the washed ground low-rank coal feedstock, and
  (2) a washed inorganic sodium content of less than about 50 wt % of the initial inorganic sodium content, but no greater than about 0.1 wt % based on the dry weight of the washed ground low-rank coal feedstock;

(d) contacting the washed ground low-rank coal feedstock with a dry gas stream and thermal energy in a thermal drying unit to generate a reduced-moisture washed ground low-rank coal feedstock and a moisture recovery stream, wherein at least a portion of the thermal energy is provided by a lower-pressure steam stream at a pressure of from about 10 psig (about 170 kPa absolute) to about 50 psig (about 446 kPa absolute), and wherein the reduced-moisture washed ground low-rank coal feedstock is free flowing with a moisture content no greater than about 40 wt % based on the total weight of the reduced-moisture washed ground low-rank coal feedstock;

(e) feeding the reduced-moisture washed ground low-rank coal feedstock and an oxygen-containing gas stream into a combustor;

(f) combusting the reduced-moisture low-rank coal feedstock in the combustor with oxygen to generate a combustion gas stream comprising steam, carbon dioxide and heat energy;

(g) recovering heat energy from the combustion gas stream by generating a higher-pressure steam stream at a pressure of at least about 150 psig (at least about 1136 kPa absolute), (h) converting at least a portion of the higher-pressure steam stream to generate the lower-pressure steam stream;

(i) condensing at least a portion of the moisture recovery stream from step (d) to generate a condensed moisture stream;

(j) treating the wastewater stream from washing step (c) to generate a recovered water stream; and (k) recycling (1) at least a portion of the condensed moisture stream, or (2) at least a portion of the recovered water stream, or (3) both (1) and (2), to the washing step (c), wherein the aqueous wash stream comprises at least in part the recycled portion of the condensed moisture stream and the recovered water stream.

The washing step (c) can occur (1) concurrently with and as a part of the grinding step (b), or (2) subsequent to the grinding step (b), or (3) both (1) and (2), but in any case before the "drying" step (d).

In one option, electricity is generated by flowing the combustion gas stream, either before or subsequent to heat recovery step (g), through a turbine that is connected to an electrical generator (with the mechanical energy generated by the turbine driving the generator).

In another option, electricity is generated by flowing the higher-pressure steam stream through a turbine that is connected to an electrical generator (with the mechanical energy generated by the turbine driving the generator).

In yet another option there is co-generation of electrical energy both from the combustion gas and the higher-pressure steam stream.

In yet another option, the raw low-rank coal feedstock has an initial moisture content, and the moisture content of the reduced-moisture washed ground low-rank coal feedstock is less than the initial moisture content of the raw low-rank coal feedstock (total wt/wt basis).

In yet another option, water can be recovered from the combustion gas by condensing at least a portion of the steam in the combustion gas. The condensation can occur, for example, as part of the heat recovery from the combustion gas, and/or subsequent thereto prior to discharge of the combustion gas from the process. Any recovered water can be sent to wastewater treatment and/or otherwise recycled back into the process.

As a consequence of steam generation and recycle for feedstock drying, and as a consequence of recycle of the moisture stream from the feedstock drying to the wash stage, the present invention provides the potential for increased efficiency and economic use of inorganic chlorine and/or inorganic sodium contaminated low-ranks coals in combustion processes where steam (and desirably electricity) are generated.

In addition, a portion of the moisture content from the raw low-rank coal feedstock can actually be recovered in the process of the present invention, particularly when the moisture content of the reduced-moisture washed ground low-rank coal feedstock is less than the initial moisture content of the raw low-rank coal feedstock. This reduces the fresh water demand of the overall process. In fact, depending on the difference between moisture contents of the raw low-rank coal feedstock and the reduced-moisture washed ground low-rank coal feedstock (and the optional recovery of moisture from the combustion gas), the present invention can provide a process that is water neutral or even water positive, which is highly desirable for operating coal combustion processes where fresh water is at a premium (for example, in arid environments).

These and other embodiments, features and advantages of the present invention will be more readily understood by those of ordinary skill in the art from a reading of the following detailed description.

DETAILED DESCRIPTION

Figure 1:
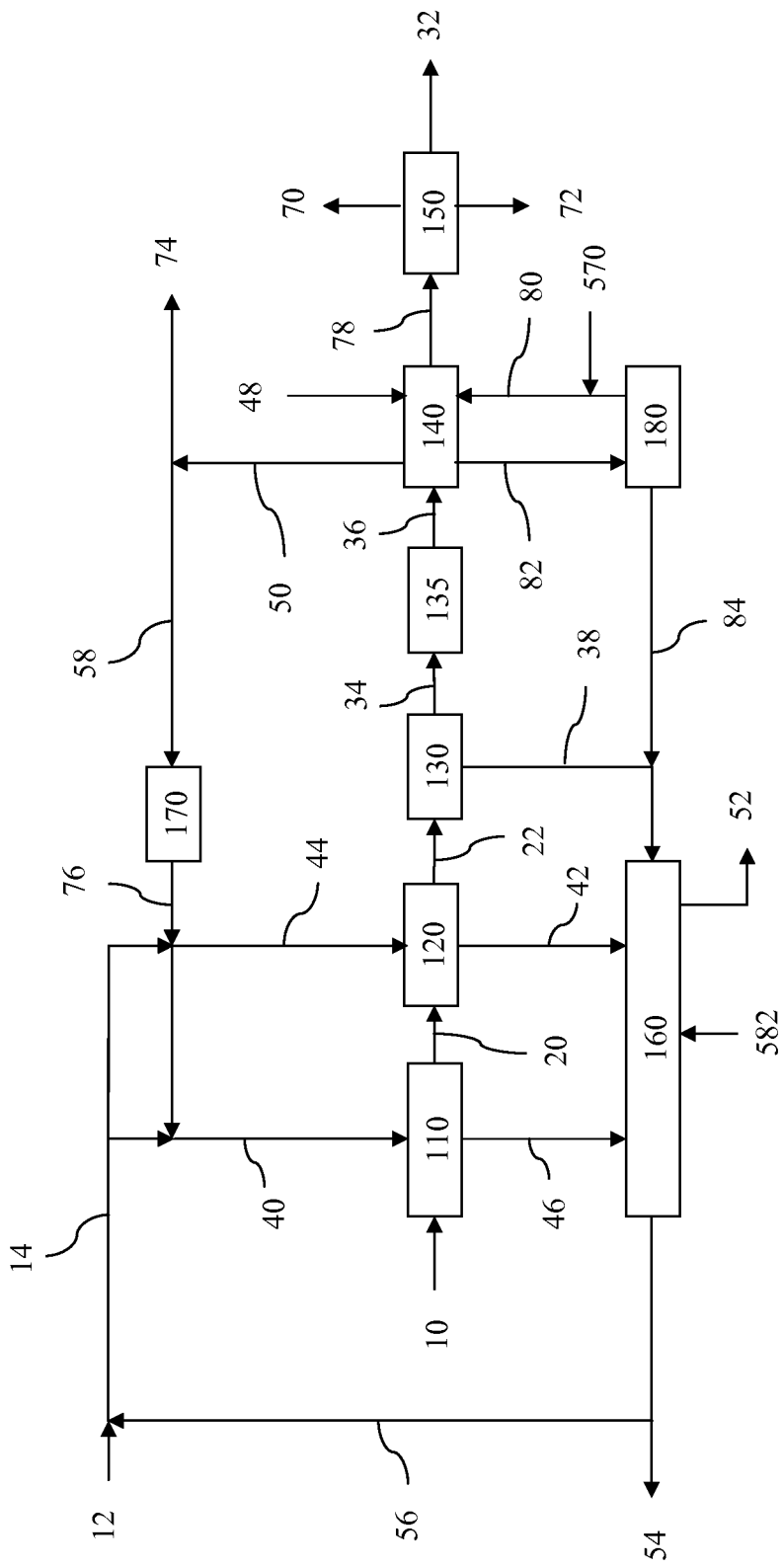
FIG. 1 is a general diagram of an embodiment of that portion of the present process in which the raw low-rank coal feedstock is processed for preparing the reduced-moisture low-rank coal feedstock that is also reduced in inorganic sodium and/or inorganic chlorine, and that is ultimately fed into the combustor (feedstock preparation portion).

The present invention relates to processes for preparing feedstocks from low-rank coals that are suitable for use in certain combustion processes, for combusting those prepared feedstocks to generate steam and optionally electricity, and for integrating the steam produced from the combustion section with the feedstock preparation section so as to minimize the amount of (or even eliminate) fresh water needed for the integrated process. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "substantial", as used herein, unless otherwise defined herein, means that greater than about 90% of the referenced material, preferably greater than about 95% of the referenced material, and more preferably greater than about 97% of the referenced material. If not specified, the percent is on a molar basis when reference is made to a molecule (such as methane, carbon dioxide, carbon monoxide and hydrogen sulfide), and otherwise is on a weight basis (such as for carbon content).

The term "predominant portion", as used herein, unless otherwise defined herein, means that greater than 50% of the referenced material. If not specified, the percent is on a molar basis when reference is made to a molecule (such as hydrogen, methane, carbon dioxide, carbon monoxide and hydrogen sulfide), and otherwise is on a weight basis (such as for carbon content).

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

The term "carbonaceous" as used herein is synonymous with hydrocarbon.

The term "carbonaceous material" as used herein is a material containing organic hydrocarbon content. Carbonaceous materials can be classified as biomass or non-biomass materials as defined herein.

The term "biomass" as used herein refers to carbonaceous materials derived from recently (for example, within the past 100 years) living organisms, including plant-based biomass and animal-based biomass. For clarification, biomass does not include fossil-based carbonaceous materials, such as coal. For example, see US2009/0217575A1, US2009/0229182A1 and US2009/0217587A1.

The term "plant-based biomass" as used herein means materials derived from green plants, crops, algae, and trees, such as, but not limited to, sweet sorghum, bagasse, sugarcane, bamboo, hybrid poplar, hybrid willow, albizia trees, eucalyptus, alfalfa, clover, oil palm, switchgrass, sudangrass, millet, jatropha, and miscanthus (e.g., Miscanthus×giganteus). Biomass further include wastes from agricultural cultivation, processing, and/or degradation such as corn cobs and husks, corn stover, straw, nut shells, vegetable oils, canola oil, rapeseed oil, biodiesels, tree bark, wood chips, sawdust, and yard wastes.

The term "animal-based biomass" as used herein means wastes generated from animal cultivation and/or utilization. For example, biomass includes, but is not limited to, wastes from livestock cultivation and processing such as animal manure, guano, poultry litter, animal fats, and municipal solid wastes (e.g., sewage).

The term "non-biomass", as used herein, means those carbonaceous materials which are not encompassed by the term "biomass" as defined herein. For example, non-biomass include, but is not limited to, anthracite, bituminous coal, sub-bituminous coal, lignite, petroleum coke, asphaltenes, liquid petroleum residues or mixtures thereof. For example, see US2009/0166588A1, US2009/0165379A1, US2009/0165380A1, US2009/0165361A1, US2009/0217590A1 and US2009/0217586A1.

"Liquid heavy hydrocarbon materials" are viscous liquid or semi-solid materials that are flowable at ambient conditions or can be made flowable at elevated temperature conditions. These materials are typically the residue from the processing of hydrocarbon materials such as crude oil. For example, the first step in the refining of crude oil is normally a distillation to separate the complex mixture of hydrocarbons into fractions of differing volatility. A typical first-step distillation requires heating at atmospheric pressure to vaporize as much of the hydrocarbon content as possible without exceeding an actual temperature of about 650° F. (about 343° C.), since higher temperatures may lead to thermal decomposition. The fraction which is not distilled at atmospheric pressure is commonly referred to as "atmospheric petroleum residue". The fraction may be further distilled under vacuum, such that an actual temperature of up to about 650° F. (about 343° C.) can vaporize even more material. The remaining undistillable liquid is referred to as "vacuum petroleum residue". Both atmospheric petroleum residue and vacuum petroleum residue are considered liquid heavy hydrocarbon materials for the purposes of the present invention.

Non-limiting examples of liquid heavy hydrocarbon materials include vacuum resids; atmospheric resids; heavy and reduced petroleum crude oils; pitch, asphalt and bitumen (naturally occurring as well as resulting from petroleum refining processes); tar sand oil; shale oil; bottoms from catalytic cracking processes; coal liquefaction bottoms; and other hydrocarbon feedstreams containing significant amounts of heavy or viscous materials such as petroleum wax fractions.

The term "asphaltene" as used herein is an aromatic carbonaceous solid at room temperature, and can be derived, for example, from the processing of crude oil and crude oil tar sands. Asphaltenes may also be considered liquid heavy hydrocarbon feedstocks.

The liquid heavy hydrocarbon materials may inherently contain minor amounts of solid carbonaceous materials, such as petroleum coke and/or solid asphaltenes, that are generally dispersed within the liquid heavy hydrocarbon matrix, and that remain solid at the elevated temperature conditions utilized as the feed conditions for the present process.

The terms "petroleum coke" and "petcoke" as used herein include both (i) the solid thermal decomposition product of high-boiling hydrocarbon fractions obtained in petroleum processing (heavy residues—"resid petcoke"); and (ii) the solid thermal decomposition product of processing tar sands (bituminous sands or oil sands—"tar sands petcoke"). Such carbonization products include, for example, green, calcined, needle and fluidized bed petcoke.

Resid petcoke can also be derived from a crude oil, for example, by coking processes used for upgrading heavy-gravity residual crude oil (such as a liquid petroleum residue), which petcoke contains ash as a minor component, typically about 1.0 wt % or less, and more typically about 0.5 wt % of less, based on the weight of the coke. Typically, the ash in such lower-ash cokes predominantly comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt %, based on the overall weight of the tar sands petcoke. Typically, the ash in such higher-ash cokes predominantly comprises materials such as silica and/or alumina.

Petroleum coke can comprise at least about 70 wt % carbon, at least about 80 wt % carbon, or at least about 90 wt % carbon, based on the total weight of the petroleum coke. Typically, the petroleum coke comprises less than about 20 wt % inorganic compounds, based on the weight of the petroleum coke.

The term "coal" as used herein means peat, lignite, sub-bituminous coal, bituminous coal, anthracite, or mixtures thereof. In certain embodiments, the coal has a carbon content of less than about 85%, or less than about 80%, or less than about 75%, or less than about 70%, or less than about 65%, or less than about 60%, or less than about 55%, or less than about 50% by weight, based on the total coal weight. In other embodiments, the coal has a carbon content ranging up to about 85%, or up to about 80%, or up to about 75% by weight, based on the total coal weight. Examples of useful coal include, but are not limited to, Illinois #6, Pittsburgh #8, Beulah (ND), Utah Blind Canyon, and Powder River Basin (PRB) coals. Anthracite, bituminous coal, sub-bituminous coal, and lignite coal may contain about 10 wt %, from about 5 to about 7 wt %, from about 4 to about 8 wt %, and from about 9 to about 11 wt %, ash by total weight of the coal on a dry basis, respectively. However, the ash content of any particular coal source will depend on the rank and source of the coal, as is familiar to those skilled in the art. See, for example, "Coal Data: A Reference", Energy Information Administration, Office of Coal, Nuclear, Electric and Alternate Fuels, U.S. Department of Energy, DOE/EIA-0064(93), February 1995.

The ash produced from combustion of a coal typically comprises both a fly ash and a bottom ash, as is familiar to those skilled in the art. The fly ash from a bituminous coal can comprise from about 20 to about 60 wt % silica and from about 5 to about 35 wt % alumina, based on the total weight of the fly ash. The fly ash from a sub-bituminous coal can comprise from about 40 to about 60 wt % silica and from about 20 to about 30 wt % alumina, based on the total weight of the fly ash. The fly ash from a lignite coal can comprise from about 15 to about 45 wt % silica and from about 20 to about 25 wt % alumina, based on the total weight of the fly ash. See, for example, Meyers, et al. "Fly Ash. A Highway Construction Material," Federal Highway Administration, Report No. FHWA-IP-76-16, Washington, D.C., 1976.

The bottom ash from a bituminous coal can comprise from about 40 to about 60 wt % silica and from about 20 to about 30 wt % alumina, based on the total weight of the bottom ash. The bottom ash from a sub-bituminous coal can comprise from about 40 to about 50 wt % silica and from about 15 to about 25 wt % alumina, based on the total weight of the bottom ash. The bottom ash from a lignite coal can comprise from about 30 to about 80 wt % silica and from about 10 to about 20 wt % alumina, based on the total weight of the bottom ash. See, for example, Moulton, Lyle K. "Bottom Ash and Boiler Slag," Proceedings of the Third International Ash Utilization Symposium, U.S. Bureau of Mines, Information Circular No. 8640, Washington, D.C., 1973.

A material such as methane can be biomass or non-biomass under the above definitions depending on its source of origin.

A "non-gaseous" material is substantially a liquid, semi-solid, solid or mixture at ambient conditions. For example, coal, petcoke, asphaltene and liquid petroleum residue are non-gaseous materials, while methane and natural gas are gaseous materials.

The term "unit" refers to a unit operation. When more than one "unit" is described as being present, those units are operated in a parallel fashion unless otherwise stated. A single "unit", however, may comprise more than one of the units in series, or in parallel, depending on the context. For example, a cyclone unit may comprise an internal cyclone followed in series by an external cyclone. As another example, a pelletizing unit may comprise a first pelletizer to pelletize to a first particle size/particle density, followed in series by a second pelletizer to pelletize to a second particle size/particle density.

The term "free-flowing" particles as used herein means that the particles do not materially agglomerate (for example, do not materially aggregate, cake or clump) due to moisture content, as is well understood by those of ordinary skill in the relevant art. Free-flowing particles need not be "dry" but, desirably, the moisture content of the particles is substantially internally contained so that there is minimal (or no) surface moisture.

The term "superheated steam" in the context of the present invention refers to a steam stream that is non-condensing under the conditions utilized, as is commonly understood by persons of ordinary skill in the relevant art.

The term "dry saturated steam" or "dry steam" in the context of the present invention refers to slightly superheated saturated steam that is non-condensing, as is commonly understood by persons of ordinary skill in the relevant art.

The term "HGI" refers to the Hardgrove Grinding Index as measured in accordance with ASTM D409/D409M-11ae1.

The term "dp(50)" refers to the mean particle size of a particle size distribution as measured in accordance with ASTM D4749-87 (2007).

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Low-Rank Coal Feedstock

The present invention in part is directed to various processes for processing raw low-rank coal feedstocks to form suitable processed low-rank coal feedstocks for combustion applications.

In step (a) the raw low-rank coal feedstock is provided.

The term "low-rank coal" is generally understood by those of ordinary skill in the relevant art. Low-rank coals include typical sub-bituminous coals, as well as lignites and peats. Low-ranks coals are generally considered to be "younger" coals than high-rank bituminous coal and anthracite, and tend to have lower particle density, higher porosity, lower fixed carbon content, higher moisture content, higher volatile content and, in many cases, higher inorganic ash content than such high rank coals.

In one embodiment, the raw low-rank coal feedstock has an inherent (total) moisture content of about 25 wt % or greater (as measured in accordance with ASTM D7582-10e1), a heating value of about 6500 kcal/kg (dry basis) or less (as measured in accordance with ASTM D5865-11a), and a fixed carbon content of about 45 wt % or less (as measured in accordance with ASTM D7582-10e1).

Typically, the raw low-rank particulate coal feedstocks will have an HGI of about 50 or greater. An embodiment of a low-rank coal for use in the present invention is a raw coal with an HGI of about 70 or greater, or from about 70 to about 130. In one embodiment, the low-rank coal is a lignite.

Typically, the raw particulate low-rank coal feedstock for use in the present processes will be substantially low-rank coal, or only low-rank coal. Mixtures of two or more different low-rank coals may also be used.

The raw low-rank coal feedstock (single or mixture) suitable for use in the present invention will possess an initial moisture content. The initial (inherent) moisture content of the raw low-rank coal feedstock is desirably high enough so that a portion of the inherent water content of the coal is recovered as a result of the drying step (d). In other words, the moisture content of the "processed" coal from the drying step should be less than the inherent moisture content of the raw low-rank coal going into the processing stage. In one embodiment, the initial moisture content of the raw low-rank coal feedstock is at least about 25 wt %, or at least about 30 wt %, or at least about 35 wt %, or at least about 40 wt %, based on total weight of the raw low-rank coal feedstock.

The raw low-rank coal feedstock (single or mixture) suitable for use in the present invention also possess and an initial contaminant content. The contaminant content of the raw low-rank coal feedstock has a chlorine component, or a sodium component, or both.

The chlorine component is an initial inorganic chlorine content of at least about 0.1 wt %, or at least about 0.2 wt %, or at least about 0.25 wt %, based on the dry weight of the raw low-rank coal feedstock. Desirably, the coal should also have an initial organic chlorine content of less than about 0.25 wt %, or less than about 0.2 wt %, or less than about 0.15 wt %, or less than about 0.1 wt %, based on the dry weight of the raw low-rank coal feedstock.

The sodium component is an initial inorganic sodium content of at least about 0.1 wt %, or at least about 0.2 wt %, or at least about 0.25 wt %, based on the dry weight of the raw low-rank coal feedstock.

Typically, when there is an inorganic chlorine component there is also a related inorganic sodium component, as inorganic chlorine is sometimes referred to as "salt chlorine".

"Inorganic" with respect to sodium and chlorine content means generally not bound into the coal matrix via organic bonds such that the sodium and chlorine can be dissolved in water (and thus potentially removed by washing), as further detailed below.

Sodium content of a coal is determined in accordance with ASTM D4326-11. In the context of the present invention, "inorganic sodium content" is the sodium content of a coal sample measured in accordance with this ASTM method (all such measured sodium is considered to be inorganic for the purposes of the present invention).

Chlorine content of a coal is determined in accordance with ASTM D4208-13. In the context of the present invention, "total chlorine content" is the chlorine content measured in accordance with the ASTM standard on a raw (unwashed) coal sample. "Organic chlorine content" is the chlorine content measured in accordance with the ASTM standard on a water-washed coal sample (in other words, the amount of chlorine not readily removed via water washing). "Inorganic chlorine content" in the context of the present invention is the difference between "total chlorine content" and "organic chlorine content".

For purposes of definition, the water washing of the coal sample for measuring the organic chlorine content is performed via the following procedure:
 (1) add 1200 g DDI (distilled de-ionized) water to each of two 2 L Erlenmeyer flasks;
 (2) add 200 g of ground low-rank coal feedstock (per ASTM D4208-13) to each flask;
 (3) stir each flask for 30 minutes at room temperature using speeds between 300 and 450 rpm (making sure that all the solids are well mixed into the water);
 (4) pour both batches into a Buchner funnel set up for vacuum suction;
 (5) start vacuum suction, and rinse with 3 400 ml aliquots of DDI water to generate a filter cake;
 (6) continue vacuum suction until the filter cake is "dry" (dripping out from suction substantially stops); then
 (7) discontinue vacuum suction and collect remaining filter cake.

This process is repeated as necessary to collect sufficient sample sizes for analysis via ASTM D4208-13.

Mixtures of a predominant amount one or more low-rank coals with a minor amount of one or more other non-gaseous carbonaceous feedstocks may also be used. Such other non-gaseous feedstocks include, for example, high-rank coals, petroleum coke, liquid petroleum residues, asphaltenes and biomass. In the event of a combination of a low-rank coal with another type of non-gaseous carbonaceous material, the heating value from the low-rank coal component must be the predominant portion of the combination. Expressed another way, the overall heating value of a combination feedstock is greater than 50%, or greater than about 66%, or greater than about 75%, or greater than about 90%, from a low-rank coal source.

As discussed in more detail below, when utilized the certain other non-gaseous carbonaceous materials may be added at various other steps in the process. For example, when a pelletizing operation is present, such materials may be used to assist in the pelletizing (binding) of the ground low-rank coal feedstock, such as liquid petroleum residues, asphaltenes and certain biomasses such as chicken manure. Such materials can also be used to modify the other properties of the combination feedstock, such as overall carbon content, water content, ash content and other properties recognizable to those of ordinary skill in the relevant art.

The raw low-rank coal feedstock may be provided directly from a mine, or it may be pre-processed as is well-known in the art by a coarse grind more suitable for transport via rail, truck or conveyor.

General Feedstock Preparation Process Information

The raw low-rank coal feedstock provided in step (a) is initially processed by grinding to a desired initial particle size, washing, optionally pelletizing, drying then optionally sizing to the desired end particle size, an embodiment of which is depicted in FIG. 1.

In accordance with that embodiment, a raw low-rank coal feedstock (10) as described above is provided and ground in step (b) to generate a ground low-rank coal feedstock of a specified particle size.

In the grinding step (b), the raw low-rank coal feedstock (10) can be crushed, ground and/or pulverized in a grinding unit (110) according to any methods known in the art, such as impact crushing and wet or dry grinding, to yield a ground low-rank coal feedstock (20) of a particle size distribution suitable for subsequent processing into a final particle size profile for the intended end use.

As indicated above, the raw low-rank coal feedstock (10) as provided to the grinding step may be as taken directly from a mine or may be initially processed, for example, by a coarse crushing to a particle size sufficiently large to be more finely ground in the grinding step.

A person of ordinary skill in the relevant end-use art will readily be able to determine the desired particle size profile for the desired end use. Different processes will have their own more narrow ranges of particle size distributions, as discussed in more detail below.

The ground low-rank coal feedstock (20) may optionally be sized directly after grinding to refine the particle size distribution by removing "coarse" and/or "fine" materials.

In one embodiment, the raw low-rank coal feedstock (10) is dry ground to a desired initial particle size profile.

In another embodiment, the raw low-rank coal feedstock (10) is wet ground by adding a stream (40) of an aqueous medium into the grinding process. Examples of suitable methods for wet grinding of coal feedstocks are well known to those of ordinary skilled in the relevant art.

In accordance with step (c) of the process, the ground low-rank coal feedstock is washed with an aqueous wash stream. This washing can take place as an integral part of a wet grinding process (washing step occurs concurrently with grinding step), in which case stream (40) is the aqueous wash stream. The wash stream containing removed contaminants is withdrawn as a wastewater stream (46).

Alternatively, such washing can take place after the grinding (and optional sizing) step in a washing unit (120), in which case stream (44) is the aqueous wash stream. The wash stream containing removed contaminants is withdrawn as a wastewater stream (42).

In addition, such washing can occur both as part of the grinding process as well as separately on the ground low-rank coal feedstock (before or after optional sizing).

As depicted in FIG. 1, the raw ground low-rank coal feedstock (20) is sent to a washing unit (120) where it is contacted with an aqueous wash stream (44) to remove various water-soluble contaminants, including inorganic chlorine and inorganic sodium, to generate a washed ground low-rank coal feedstock (22).

Coal washing processes suitable for use in washing unit (120) are well known to those of ordinary skill in the relevant art. One suitable such process involves utilizing one or a series of vacuum belt filters, where the ground coal is transported on a vacuum belt while it is sprayed with an aqueous medium, typically recycle water recovered from the treatment of wastewater streams from the process (for example, from the treatment of wastewater stream (42) and/or wastewater stream (46)). Additives such as surfactants, flocculants and pelletizing aids can also be applied at this stage. For example, surfactants and flocculants can be applied to assist in dewatering in the vacuum belt filters and/or any subsequent dewatering stages.

The resulting washed ground low-rank coal feedstock (22) will typically be in the form of a wet filter cake or concentrated slurry with a high water content, that will typically require an initial dewatering stage (optional dewatering unit (130)) to remove a portion of the water content and generate an initial dewatered ground low-rank coal feedstock (34) having a water content suitable for subsequent processing.

Methods and equipment suitable for dewatering wet coal filter cakes and concentrated coal slurries in this dewatering stage are well-known to those of ordinary skill in the relevant art and include, for example, filtration (gravity or vacuum), centrifugation and fluid press methods and equipment. Hydrophobic organic compounds and solvents having an affinity for the coal particles can be used to promote dewatering.

A wastewater steam (38) generated from dewatering unit (130) can, for example, be sent to wastewater treatment unit (160) for treatment along with wastewater streams (42) and (46) to generate a cleaned water stream (54) and a concentrated contaminant stream (52).

Cleaned water stream (54) recovered from wastewater treatment unit (160) is desirably recycled for use elsewhere in the process. For example, all or a portion of cleaned water stream (54) is recycled as recycle water stream (56), which can be combined with fresh water stream (12) to generate a water feed stream (14) for use as aqueous wash stream (40) and/or (44). Alternatively or in addition, all or a portion of cleaned water stream (54) can be recycled to the combustion section of the process for use in generating steam, as discussed in more detail below.

Depending on the type and amount of contaminants in concentrated contaminant stream (52), that stream can desirably be further processed to recover some of the contaminant components, or disposed of in an acceptable manner.

Depending on the properties of the raw low-rank coal feedstock (for example, HGI) and the desired end use, it may be desirable to agglomerate washed ground low-rank coal feedstock (22) (or initial dewatered ground low-rank coal feedstock (34) if present) in a subsequent pelletization unit (135) to generate a pelletized low-rank coal feedstock (36) of a suitable particle size distribution for the ultimate end use. For the purposes of the present invention, agglomeration/pelletization refers to both pelletization and briquetting processes for agglomerating and increasing particle size, of types that are generally known to those of ordinary skill in the relevant art.

One particular process for preparing agglomerated low-rank coal feedstocks is disclosed in previously incorporated U.S. application Ser. No. 14/039,321, entitled AGGLOMERATED PARTICULATE LOW-RANK COAL FEEDSTOCK AND USES THEREOF) now U.S. Pat. No. 9,034,061.

When agglomerization is utilized, additional fines materials of appropriate particle size from other sources (not depicted) can be added into the process at various places prior to pelletization unit (135). For example, fines materials from other coal and/or petcoke processing operations can be combined with washed ground low-rank coal feedstock (22) (or initial dewatered ground low-rank coal feedstock (34) if present) to modify (e.g., further reduce) the water content and/or increase the carbon content of the same.

Binders of various sorts are typically utilized in the agglomeration step. Suitable binders are generally well-known to those of ordinary skill in the relevant art and include organic and inorganic binders. Organic binders include, for example, various starches, flocculants, natural and synthetic polymers, biomass such as chicken manure, and dispersed/emulsified oil materials such as a dispersed liquid petroleum resid. Inorganic binders include mineral binders.

The pelletizing step should result in wet agglomerated low-rank coal particles (36) having a dp(50) close to a target dp(50) for the desired end use, which dp(50) can be further refined by a sizing step as discussed below.

Depending on the moisture content of the wet agglomerated low-rank coal particles (23), those particles may or may not be free flowing, and/or may not be structurally stable, and/or may have too high a moisture content for the desired end use, and may optionally need to go through an additional intermediate dewatering stage in a dewatering unit (not depicted) to generate a dewatered agglomerated low-rank coal feedstock. Methods suitable for dewatering the wet agglomerated low-rank coal particles (32) in dewatering stage are well-known to those of ordinary skill in the relevant art and include, for example, filtration (gravity or vacuum), centrifugation and fluid press.

In accordance with step (d) of the process, the washed ground low-rank coal feedstock (22) (or initial dewatered ground low-rank coal feedstock (34) if dewatering unit (130) is present, or wet agglomerated low-rank coal particles (36) if pelletizing unit (135) is present) is dried in a thermal drying unit (140) by contact with a gas stream (80) and that utilizes a lower-pressure steam stream (48) as a heat source, to generated a reduced-moisture washed ground low-rank coal feedstock (78), a recovery steam stream (50) and a recovered moisture stream (82). Sufficient moisture is removed so that the resulting reduced-moisture washed ground low-rank coal feedstock (78) is a free-flowing particulate. The amount of moisture necessary for removal can be readily determined by a person of ordinary skill in the art based on the composition and properties of the material entering thermal drying unit (140).

In accordance with the present invention, lower-pressure steam stream (48) is a steam stream derived and recycled from the combustion section of the present process, as discussed in more detail below.

Figure 2:
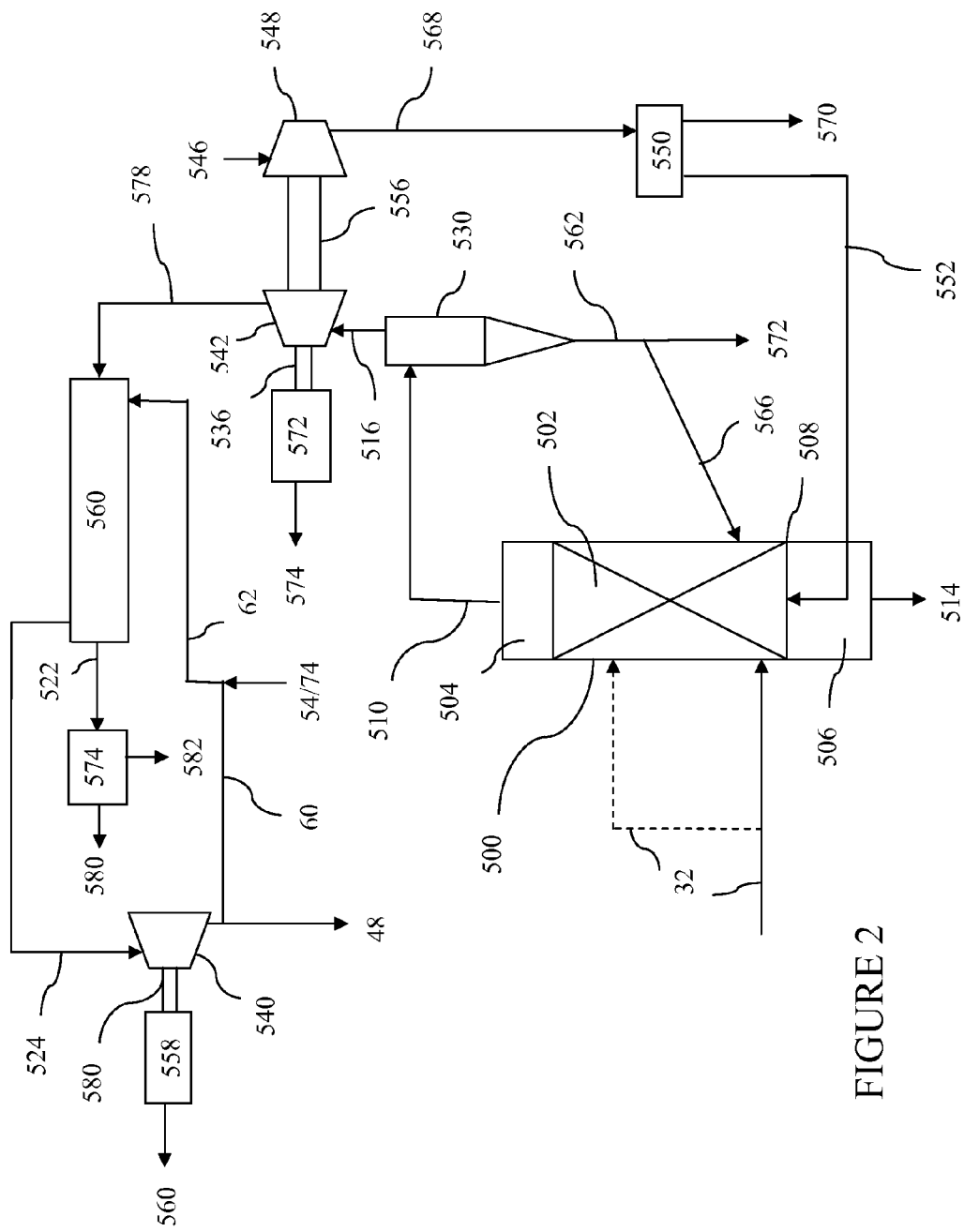
FIG. 2 is a general diagram of an embodiment of that portion of the present process (the combustion portion) in which the reduced-moisture low-rank coal feedstock is combusted to produce steam and cogenerate electrical power.

The thermal drying unit (140) is typically a fluidized-bed dryer in which the coal particles are fluidized by gas stream (80) fed into thermal drying unit (140). Gas stream (80) is typically a "dry" air or nitrogen-enriched gas stream, for example, nitrogen-enriched stream (570) from an air separation unit (550) as shown in FIG. 2 and discussed in more detail below. Such fluidized-bed dryers are well-known to those of ordinary skill in the relevant art and generally commercially available, and "dry gas stream" in the context of the present invention means sufficiently dry to be able to pick up moisture from the wet coal under the conditions utilized within thermal drying unit (140), as is understood by those persons of ordinary skill in the relevant art.

Gas stream (80) is typically provided at slightly elevated pressures, for example, at pressures slightly above atmospheric up to about 50 psig (about 446 kPa absolute), or up to about 30 psig (about 308 kPa absolute), or up to about 15 psig (about 205 kPa absolute).

The lower-pressure steam stream (48) is provided at a pressure of from about 10 psig (about 170 kPa absolute), or about 15 psig (about 205 kPa absolute), to about 50 psig (about 446 kPa absolute), or to about 40 psig (about 377 kPa absolute), or to about 30 psig (about 308 kPa absolute).

The combination of the dry gas in gas stream (80) plus the heat energy transferred from lower-pressure steam stream (48) is sufficient to remove the desired amount of moisture from the wet feed to generate a reduced-moisture washed ground low-rank coal feedstock (78) that is free flowing. Desirably, the amounts of lower-pressure steam stream (48) and gas stream fed into thermal drying unit (140) are sufficient in combination so that the resulting reduced-moisture washed ground low-rank coal feedstock (78) has a moisture content of less than the initial moisture content of the raw low-rank coal feedstock (10), but no greater than about 40 wt %, or no greater than about 35 wt %, or nor greater than about 30 wt %, based on the total weight of the reduced-moisture washed ground low-rank coal feedstock (78).

Recovery steam stream (50) from thermal drying unit (140) is desirably recycled back into the process, either as a recycle steam stream (74) back to the combustion section of the process, and/or as recycle steam stream (58) back to the feedstock preparation stage, for example, as part of aqueous stream (40) and/or (44). When recycled back for use in the feedstock preparation stage, recycle seam stream (58) is very low-grade steam which is typically condensed to water, for example, via an air-cooled condensor (170) to generate a recycle water stream (76). Recovery steam stream (50) may also or alternatively be recycled in whole or part to water treatment unit (160) after being condensed.

The moisture in recovered moisture stream (82) is also desirably recycled back into the process. Typically, this moisture is condensed to water, for example, via an air-cooled condensor (180) to generate a recycle water stream (84) that is typically fed into water treatment unit (160) after being condensed. Recycle water stream may also or alternatively be recycled in whole or part back to the feedstock preparation stage, for example, as part of aqueous stream (40) and/or (44). The gas from which the moisture has been condensed can then be recycled as gas stream (80), optionally in combination with makeup gas from stream (570).

Typically, but optionally, a final sizing stage in a sizing unit (150) is provided to refine the particle distribution of the reduced-moisture washed ground low-rank coal feedstock (78), where all or a portion of particles above a target upper end size (large or "bigs") (stream (70)) and below a target lower end particle size (fines or "smalls") (stream (72)) are removed to result in the low-rank coal feedstock (32) for feeding into a combustor. Methods suitable for sizing are generally known to those of ordinary skill in the relevant art, and typically include screening units with appropriately sized screens. In one embodiment, at least 90 wt %, or at least 95 wt %, of either or both (desirably) of the bigs and smalls (based on a defined particle size distribution for low-rank coal feedstock (32) as fed into the combustion section of the process) are removed in this final sizing stage.

Other than any thermal drying, which takes place at elevated temperature and pressure conditions, all operations in the feedstock preparation stage generally take place under ambient temperature and pressure conditions. In one embodiment, however, the washing stage can take place under elevated temperature conditions (for example, using heated wash water) to promote dissolution of contaminants being remove during the washing process.

As indicated above, the final particle size distribution, well as other properties such as moisture content, for low-rank coal feedstock (32) will be specified for the ultimate end use, and will depend on factors such as the type of combustor, feedstock physical and chemical properties, and other known factors as will be recognized and understood by a person of ordinary skill in the relevant art.

In one embodiment, the resulting low-rank coal feedstock (32) has a particle size distribution suitable for a circulating fluidized-bed combustor, for example, a dp(50) which is a value in the range of from about 3000 microns to about 6000 microns.

In another embodiment, the resulting low-rank coal feedstock (32) has a particle size distribution suitable for a pulverized coal boiler, for example, a dp(50) which is a value in the range of from about 100 microns to about 200 microns.

Desirably, the combination of recycle water stream (56) and recycle steam stream (58) (or recycle water stream (76) if recycle steam stream (58) has been condensed) is such as to minimize or even eliminate fresh water stream (12). In one embodiment, the overall process is substantially water neutral in that substantially no fresh water is added in steady state operation of the process, for example, where fresh water stream (12) is about 5 wt % or less, or about 2 wt % or less, or about 0 wt %, based on the combined weight of fresh water stream (12), recycle water stream (56) and recycle steam stream (58) (or recycle water stream (76) if recycle steam stream (58) has been condensed). In another embodiment, the overall process is water positive in that water can actually be removed from the system, for example, as a portion of cleaned water stream (54), and used elsewhere.

Combustion Processes

As a general concept, in combustion processes the carbon in coal is burned for heat which can be recovered, for example, to generate steam various industrial uses, including but not limited to electricity generation, and for exhaust gases that can be used to drive turbines for electricity generation.

Suitable combustion technologies, operating conditions, and equipment and configurations, are generally known to those of ordinary skill in the relevant art, and many applicable technologies are commercially available.

On such technology utilizes a circulating fluidized-bed combustor ("CFB"). CFBs generally operate at relatively moderate temperatures typically ranging from about 760° C. to about 930° C. CFBs typically utilize coarser particles having a dp(50) ranging from about 3000 microns to about 6000 microns.

Another technology utilizes a pulverized coal boiler ("PCB"). PCBs operate at high temperatures typically ranging from about 1300° C. to about 1700° C. PCBs typically utilize finer particles having a dp(50) ranging from about 100 to about 200 microns.

The combustors can be operated at various pressures ranging from atmospheric to much higher pressure conditions, and typically use air for the fluidizing medium, which is typically enriched in oxygen to promote combustion.

Figure 3:
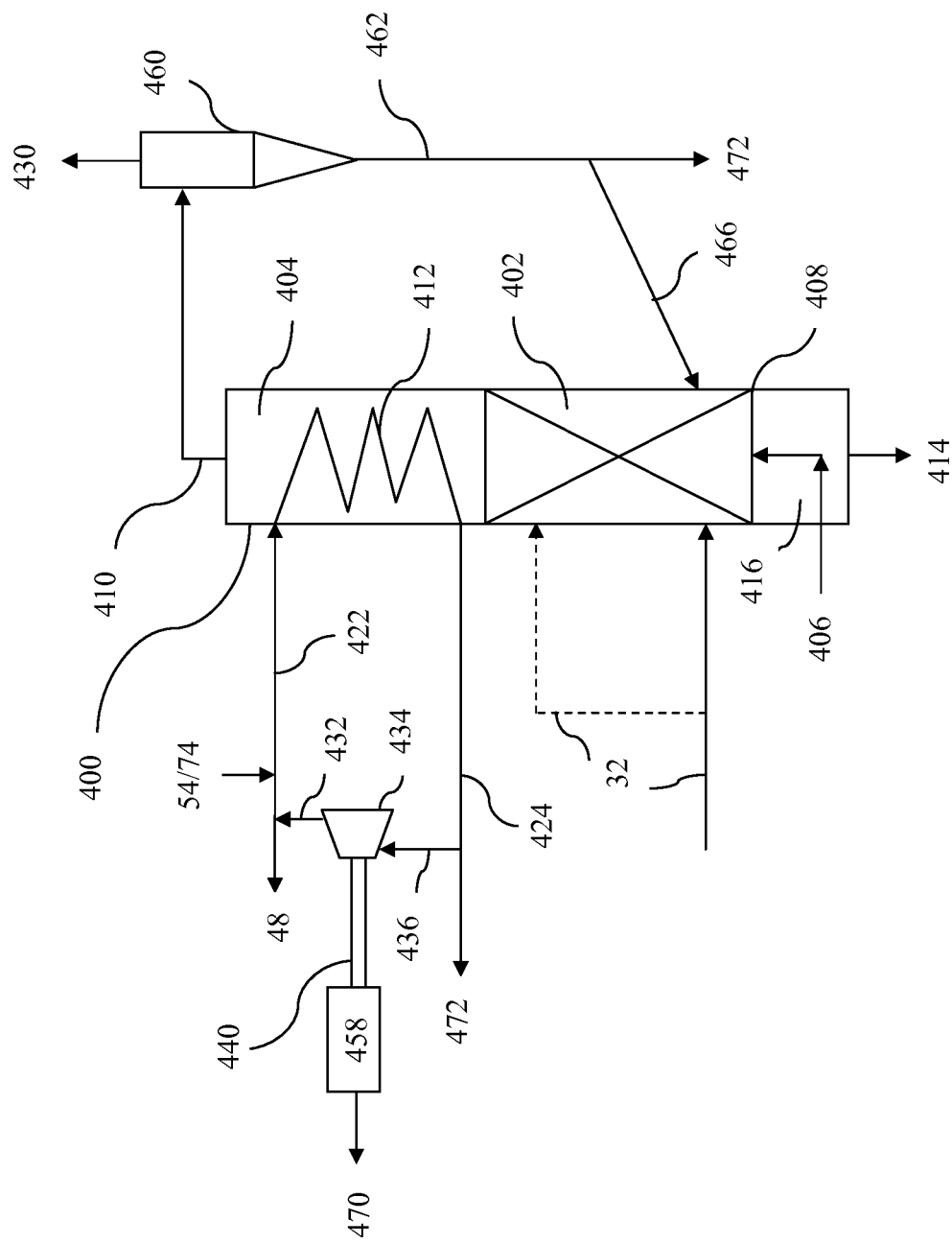
FIG. 3 is a general diagram of another embodiment of the combustion portion of the present process for producing higher-pressure steam with optional cogeneration of electricity.

All combustion processes will involve a reactor (combustor), which is generically depicted as (500) in FIG. 2 and (400) in FIG. 3, where the low-rank coal feedstock (32) will be combusted to produce heat energy and an exhaust gas (510) (FIG. 2) and (410) (FIG. 3).

Referring to FIG. 2, there is depicted one embodiment of the combustion section of the present invention in which there is co-generation of steam and electricity, and co-generation of electricity from the combustion gases as well as the generated steam.

In FIG. 2, the low-rank coal feedstock (32) and an air or oxygen-enriched air stream (552) is fed into a combustion reactor (500) containing a bed (502) in which the carbon is combusted to generate a combustion gas typically comprising carbon dioxide, water vapor, heat energy, entrained solids and other contaminant by-products depending on the coal composition and combustion conditions.

Depending on the particular process, the low-rank coal feedstock (32) may be fed into combustion reactor (500) at one or more different locations optimized for the particular combustion process, as will be recognized by a person of ordinary skill in the relevant art.

The combustion in combustion reactor (500) will typically occur in a bed (502) of the feedstock (32) that is fluidized by the flow of the air or oxygen-enriched air stream (552) and/or other fluidizing gases (like carbon dioxide and/or nitrogen) that may be fed to combustion reactor (500).

Typically, combustion is a non-catalytic process, so no catalyst needs to be added to the feedstock (32) or into combustion reactor (500); however, a catalyst that promotes combustion may be utilized.

Typically, carbon conversion is substantially complete in combustion processes, and any residual solid residues are predominantly inorganic ash with little or no carbon residue. Depending on reaction conditions, combustion may be slagging or non-slagging, where a residue (514) is withdrawn from combustion reactor (500) as a molten (slagging) or solid (non-slagging) ash or char (to the extent there is still appreciable carbon content in the solid residue). Typically the residue is collected in a section (506) below bed (502) and withdrawn from the bottom of combustion reactor (500), but ash may also be withdrawn from the top (504) of combustion reactor (500) along with the raw combustion gas stream (510).

Section (506) and fluidized bed (502) can be separated, for example, by a grid plate (508).

The raw combustion gas stream (510) is typically withdrawn from the top or upper portion (504) of combustion reactor (500).

The hot gas effluent leaving bed (502) of combustion reactor (500) can pass through a fines remover unit (such as cyclone assembly (530)), incorporated into and/or external of combustion reactor (500), which serves as a disengagement zone. Particles too heavy to be entrained by the gas leaving combustion reactor (500) can be returned to combustion reactor (500), for example, to bed (502).

Residual entrained fines are substantially removed by any suitable device such as internal and/or external cyclone separators (530) to generate a fines-depleted raw combustion gas stream (516). At least a portion of these fines can be returned to bed (502) via recycle lines (562) and (566), particularly to the extent that such fines still contain material carbon content (can be considered char). Alternatively, any fines or ash (572) can be removed via line (562).

As set forth in FIG. 2, combustion reactor (500) is operated under sufficient pressure conditions such that the fines-depleted raw combustion gas stream (516) can be used to mechanically drive a turbine (542). Turbine (542) is connected to an electrical generator (574) by a shaft (536) or other mechanical coupling, and the mechanical energy generated by turbine (542) drives generator (572) so that electrical power (574) is produced.

Turbine (542) may also desirably be mechanically connected to an air compressor (548) or similar device by a shaft (556) or other mechanical coupling, and the mechanical energy generated by turbine (542) drives air compressor (548) to compress an air stream (546) and generate a compressed air stream (568) for feeding back into combustion reactor (500) as air stream (552). Compressed air stream (568) can optionally be fed into an air separation device (550), for example a membrane or cryogenic separator, to enrich the oxygen content of compressed air stream (568) for use as oxygen-enriched stream (552). In one embodiment, air separation device (550) is a cryogenic separator, and electricity generated from the process can be used to power that unit.

The separated out gaseous components, shown as stream (570) and which will be predominantly nitrogen, can be discharged or used elsewhere in the process, for example, as stream (80) or makeup gas for stream (80) for use in thermal drying unit (140) as discussed above.

The exhaust gas (578) exiting turbine (542) still contains substantial heat energy, which can be recovered, for example, in a heat recovery steam generator ("HSRG") (560). HSRGs are in a general sense well known to those of ordinary skill in the relevant art. For example, exhaust gas (578) can fed through heating coils (not depicted) in HSRG (560) to generate steam or further heat steam from an aqueous stream (62), which can be water and/or steam, fed into HSRG (560) to generate steam stream (524) and a reduced heat exhaust gas stream (522). As reduced heat exhaust gas stream (522) will typically contains a significant amount of water content (as steam), stream (522) can be passed through a cooling unit (574), such as an air cooling unit of a type well known to those of ordinary skill in the relevant art, to condense out moisture and generate a water recovery stream (582) and a cooled exhaust gas stream (580).

Cooled exhaust gas stream (580) is typically discharged to the atmosphere, but can be further treated by known processes prior to discharge.

Water recovery stream (582) is also desirably recycled back into the process. Typically, water recovery stream (582) will be fed into water treatment unit (160), as shown in FIG. 1. Water recovery stream (582) may also or alternatively be recycled in whole or part back to the feedstock preparation stage, for example, as part of aqueous stream (40) and/or (44).

Steam stream (524) is typically a medium pressure steam stream that can be fed into a second turbine (540) which is connected to an electrical generator (558) by a shaft (580) or other mechanical coupling, and the mechanical energy generated by turbine (540) drives generator (558) so that electrical power (560) is produced.

Lower pressure steam stream (48) exits turbine (540) which, as shown in FIG. 1, can be fed into thermal drying unit (140) to provide thermal drying energy.

A portion of lower pressure steam stream (48) can also be recycled back to HSRG (560) as stream (60), which can be combined with a portion of cleaned water stream (54) and/or recycle steam stream (74) for use as aqueous stream (62). Desirably, however, a portion of cleaned water stream (54) and/or recycle steam stream (74) can also be used as aqueous stream (62) without utilizing any of lower pressure steam stream (48) so that the thermal energy use of lower pressure steam stream (48) can be maximized in thermal drying unit (140).

Referring now to FIG. 3, there is depicted another embodiment of the combustion section of the present invention in which there is co-generation of higher-pressure steam and electricity.

In FIG. 3, the low-rank coal feedstock (32) and an air or oxygen-enriched air stream (406) are fed into a combustion reactor (400) containing a bed (402) in which the carbon is combusted to generate a combustion gas typically comprising carbon dioxide, water vapor, heat energy, entrained solids and other contaminant by-products depending on the coal composition and combustion conditions.

Depending on the particular process, the low-rank coal feedstock (32) may be fed into combustion reactor (400) at one or more different locations optimized for the particular combustion process, as will be recognized by a person of ordinary skill in the relevant art.

The combustion in combustion reactor (400) will typically occur in a bed (402) of the feedstock (32) that is fluidized by the flow of the air or oxygen-enriched air stream (406) and/or other fluidizing gases (like carbon dioxide and/or nitrogen) that may be fed to combustion reactor (400).

Typically, combustion is a non-catalytic process, so no catalyst needs to be added to the feedstock (32) or into combustion reactor (400); however, a catalyst that promotes combustion may be utilized.

Typically, carbon conversion is substantially complete in combustion processes, and any residual solid residues are predominantly inorganic ash with little or no carbon residue. Depending on reaction conditions, combustion may be slagging or non-slagging, where a solid residue (414) is withdrawn from combustion reactor (400) as a molten (slagging) or solid (non-slagging) ash or char (to the extent there is still appreciable carbon content in the solid residue). Typically the residue is collected in a section (416) below bed (402) and withdrawn from the bottom of combustion reactor (400), but ash may also be withdrawn from the top (404) of combustion reactor (400) along with the raw combustion gas stream (410).

Section (406) and fluidized bed (402) can be separated, for example, by a grid plate (408).

The raw combustion gas stream (410) is typically withdrawn from the top or upper portion (404) of combustion reactor (400).

The hot gas effluent leaving bed (402) of combustion reactor (400) can pass through a fines remover unit (such as cyclone assembly (460)), incorporated into and/or external of combustion reactor (400), which serves as a disengagement zone. Particles too heavy to be entrained by the gas leaving combustion reactor (400) can be returned to combustion reactor (400), for example, to bed (402).

Residual entrained fines are substantially removed by any suitable device such as internal and/or external cyclone separators (460) to generate a fines-depleted raw combustion gas stream (430). At least a portion of these fines can be returned to bed (402) via recycle lines (462) and (466), particularly to the extent that such fines still contain material carbon content (can be considered char). Alternatively, any fines or ash (472) can be removed via line (462).

As set forth in FIG. 3, heat generated in combustion reactor (400) can be recovered via a heat exchanger (412) that can be used to generate steam from water, or superheat steam, that is fed into heat exchanger (412) via stream (422). Heat exchanger (412) can be integral with and/or external of combustion reactor (400). For example, a low-pressure steam stream can be passed through heat exchanger (412) where it is superheated to produce a high-pressure steam stream (424) that can be used for various industrial processes, including but not limited to driving a steam turbine for the generation of electricity. In that context, stream (422) can be made up in whole or part from cleaned water stream (54) and/or recycle steam stream (74), and can include a part of a lower-pressure steam stream (432) coming off of a turbine (434) as discussed below.

In the configuration of FIG. 3, steam stream (424) is typically a high-pressure steam stream (also typically a dry or superheated steam stream) that can be fed in whole or in part via stream (436) to turbine (434) which is connected to an electrical generator (458) by a shaft (440) or other mechanical coupling, and the mechanical energy generated by turbine (434) drives generator (458) so that electrical power (470) is produced.

A lower pressure steam stream (432) exits turbine (434), which is used in whole or part as lower-pressure steam stream (48) for feeding into thermal drying unit (140) as discussed above.

That portion of high-pressure steam stream (424) not fed into turbine (434) can be removed as steam stream (472) and utilized elsewhere. Generally, in the configuration of FIG. 3, sufficient high-pressure steam is produced so that only a portion is needed to feed turbine (434) and ultimately generate lower-pressure steam stream (48).

A portion of lower pressure steam stream (432) can also be recycled back to heat exchanger (412) as stream (422), which can be combined with a portion of cleaned water stream (54) and/or recycle steam stream (74) for use as stream (422). Desirably, however, a portion of cleaned water stream (54) and/or recycle steam stream (74) can also be used as stream (422) without utilizing any of lower pressure steam stream (432) so that all of stream (432) is used as lower pressure steam stream (48), and the thermal energy use of lower pressure steam stream (48) can be maximized in thermal drying unit (140).

Fines-depleted raw combustion gas stream (430) still contains substantial heat energy as well as steam, and can be further processed to mechanically drive a turbine for electrical power generation and/or to drive an air compressor, and/or recover heat energy and/or steam in a similar fashion as set forth above in connection with the discussion of FIG. 2.

Multi-Train Processes

In the processes of the invention, each process may be performed in one or more processing units. For example, one or more combustors may be supplied with the feedstock from one or more feedstock preparation unit operations.

In certain embodiments, the processes utilize two or more combustors (e.g., 2-4 combustors). In such embodiments, the processes may contain divergent processing units (i.e., less than the total number of combustors) prior to the combustors for ultimately providing the feedstock to the plurality of combustors, and/or convergent processing units (i.e., less than the total number of combustors) following the combustors for processing the plurality of combustion gas streams generated by the plurality of combustors.

When the systems contain convergent processing units, each of the convergent processing units can be selected to have a capacity to accept greater than a 1/n portion of the total feed stream to the convergent processing units, where n is the number of convergent processing units. Similarly, when the systems contain divergent processing units, each of the divergent processing units can be selected to have a capacity to accept greater than a 1/m portion of the total feed stream supplying the convergent processing units, where m is the number of divergent processing units.

We claim:

1. A process for generating steam from a particulate low-rank coal feedstock, the process comprising the steps of:
   (a) providing a raw low-rank coal feedstock comprising an initial contaminant content, wherein the initial contaminant content comprises
      (1) an initial inorganic chlorine content of at least about 0.1 wt % based on the dry weight of the raw low-rank coal feedstock, or
      (2) an initial inorganic sodium content of at least about 1.0 wt % based on the dry weight of the raw low-rank coal feedstock, or
      (3) both (1) and (2);
   (b) grinding the raw low-rank coal feedstock to produce a ground low-rank coal feedstock;
   (c) washing the ground low-rank coal feedstock with an aqueous wash stream to generate a washed ground low-rank coal feedstock and a wastewater stream, the washed ground low-rank coal feedstock having
      (1) a washed inorganic chlorine content of less than about 50 wt % of the initial inorganic chlorine content, but no greater than about 0.1 wt % based on the dry weight of the washed ground low-rank coal feedstock, and
      (2) a washed inorganic sodium content of less than about 50 wt % of the initial inorganic sodium content, but no greater than about 0.1 wt % based on the dry weight of the washed ground low-rank coal feedstock;
   (d) contacting the washed ground low-rank coal feedstock with a dry gas stream and thermal energy in a thermal drying unit to generate a reduced-moisture washed ground low-rank coal feedstock and a moisture recovery stream, wherein at least a portion of the thermal energy is provided by a lower-pressure steam stream at a pressure of from about 10 psig (about 170 kPa absolute) to about 50 psig (about 446 kPa absolute), and wherein the reduced-moisture washed ground low-rank coal feedstock is free flowing with a moisture content no greater than about 40 wt % based on the total weight of the reduced-moisture washed ground low-rank coal feedstock;
   (e) feeding the reduced-moisture washed ground low-rank coal feedstock and an oxygen-containing gas stream into a combustor;
   (f) combusting the reduced-moisture low-rank coal feedstock in the combustor with oxygen to generate a combustion gas stream comprising steam, carbon dioxide and heat energy;
   (g) recovering heat energy from the combustion gas stream by generating a higher-pressure steam stream at a pressure of at least about 150 psig (at least about 1136 kPa absolute),
   (h) converting at least a portion of the higher-pressure steam stream to generate the lower-pressure steam stream;
   (i) condensing the moisture stream from step (d) to generate a condensed moisture stream;
   (j) treating the wastewater stream from washing step (c) to generate a recovered water stream; and
   (k) recycling (1) at least a portion of the condensed moisture stream, or (2) at least a portion of the recovered water stream, or (3) both (1) and (2), to the washing step (c), wherein the aqueous wash stream comprises at least in part the recycled portion of the condensed moisture stream and the recovered water stream.

2. The process of claim 1, wherein the raw low-rank particulate coal feedstock has a Hardgrove Grinding Index of about 50 or greater.

3. The process of claim 2, wherein the raw low-rank particulate coal feedstock has a Hardgrove Grinding Index of about 70 or greater.

4. The process of claim 3, wherein the raw low-rank particulate coal feedstock has a Hardgrove Grinding Index of from about 70 to about 130.

5. The process of claim 1, wherein the grinding step is a wet grinding step.

6. The process of claim 1, wherein the washing step and the grinding step occur concurrently.

7. The process of claim 1, wherein there is a washing step that occurs after the grinding step.

8. The process of claim 1, wherein the washed ground low-rank coal feedstock is agglomerated subsequent to step (c) and before step (d).

9. The process of claim 1, wherein the reduced-moisture washed ground low-rank coal feedstock fed into the combustor has a particle size distribution in which the dp(50) is a value between about 100 microns and about 6000 microns.

10. The process of claim 9, wherein the dp(50) is a value in the range of from about 3000 microns to about 6000 microns.

11. The process of claim 1, wherein the combustor is a circulating fluidized-bed combustor.

12. The process of claim 10, wherein the combustor is a circulating fluidized-bed combustor.

13. The process of claim 9, wherein the dp(50) is a value in the range of from about 100 microns to about 200 microns.

14. The process of claim 1, wherein the combustor is a pulverized coal boiler.

15. The process of claim 10, wherein the combustor is a pulverized coal boiler.

16. The process of claim 1, wherein the raw low-rank coal feedstock possesses an initial moisture content, and the moisture content of the reduced-moisture washed ground low-rank coal feedstock is less than the initial moisture content of the raw low-rank coal feedstock (total wt/wt basis).

17. The process of claim 16, wherein the initial moisture content of the raw low-rank coal feedstock is at least about 25 wt % based on total weight of the raw low-rank coal feedstock.

* * * * *